(12) United States Patent
Lobert et al.

(10) Patent No.: US 9,550,928 B2
(45) Date of Patent: Jan. 24, 2017

(54) ALKOXYSILYL-CONTAINING ADHESIVE SEALANTS WITH INTRINSICALLY REDUCED VISCOSITY

(71) Applicant: EVONIK DEGUSSA GMBH, Essen (DE)

(72) Inventors: Matthias Lobert, Essen (DE); Michael Ferenz, Essen (DE); Anke Lewin, Duesseldorf (DE); Frank Schubert, Neukirchen-Vluyn (DE)

(73) Assignee: EVONIK DEGUSSA GMBH, Essen (DE)

( * ) Notice: Subject to any disclaimer, the term of this patent is extended or adjusted under 35 U.S.C. 154(b) by 0 days.

(21) Appl. No.: 14/784,678

(22) PCT Filed: Mar. 13, 2014

(86) PCT No.: PCT/EP2014/054940
§ 371 (c)(1),
(2) Date: Oct. 15, 2015

(87) PCT Pub. No.: WO2014/170072
PCT Pub. Date: Oct. 23, 2014

(65) Prior Publication Data
US 2016/0053145 A1 Feb. 25, 2016

(30) Foreign Application Priority Data

Apr. 17, 2013 (DE) .................. 10 2013 206 883

(51) Int. Cl.
| | | |
|---|---|---|
| C08G 18/00 | (2006.01) | |
| C09J 171/08 | (2006.01) | |
| C08G 65/22 | (2006.01) | |
| C08G 18/50 | (2006.01) | |
| C08G 65/336 | (2006.01) | |
| C08G 18/75 | (2006.01) | |
| C09J 175/08 | (2006.01) | |
| C09K 3/10 | (2006.01) | |
| C08G 18/10 | (2006.01) | |

(52) U.S. Cl.
CPC .......... C09J 171/08 (2013.01); C08G 18/5096 (2013.01); C08G 18/755 (2013.01); C08G 65/22 (2013.01); C08G 65/336 (2013.01); C09J 175/08 (2013.01); C09K 3/1006 (2013.01); C08G 2190/00 (2013.01); C09J 2471/003 (2013.01); C09J 2475/003 (2013.01)

(58) Field of Classification Search
CPC .......................... C08G 18/5096; C07F 7/025
USPC ............ 528/28, 48, 49, 76, 79, 80, 84, 85
See application file for complete search history.

(56) References Cited

U.S. PATENT DOCUMENTS

| | | |
|---|---|---|
| 7,598,334 B2 | 10/2009 | Ferenz et al. |
| 7,605,284 B2 | 10/2009 | Brueckner et al. |
| 7,635,581 B2 | 12/2009 | Ferenz et al. |
| 8,138,294 B2 | 3/2012 | Henning et al. |
| 8,198,473 B2 | 6/2012 | Ferenz et al. |
| 8,247,525 B2 | 8/2012 | Schubert et al. |
| 8,283,422 B2 | 10/2012 | Schubert et al. |
| 8,309,664 B2 | 11/2012 | Knott et al. |
| 8,309,673 B2 | 11/2012 | Schubert et al. |
| 8,324,325 B2 | 12/2012 | Knott et al. |
| 8,334,355 B2 | 12/2012 | Henning et al. |
| 8,420,748 B2 | 4/2013 | Henning et al. |
| 8,450,514 B2 | 5/2013 | Schubert et al. |
| 8,455,603 B2 | 6/2013 | Ferenz et al. |
| 8,557,944 B2 | 10/2013 | Henning et al. |
| 8,779,079 B2 | 7/2014 | Henning et al. |
| 8,802,744 B2 | 8/2014 | Knott et al. |
| 8,883,932 B2 | 11/2014 | Brugger et al. |
| 8,921,437 B2 | 12/2014 | Knott et al. |
| 8,946,369 B2 | 2/2015 | Henning et al. |
| 8,957,009 B2 | 2/2015 | Schubert et al. |
| 8,974,627 B2 | 3/2015 | Schubert et al. |
| 8,993,706 B2 | 3/2015 | Schubert et al. |
| 9,315,614 B2 * | 4/2016 | Schubert ............ C08G 18/5096 |
| 2005/0261457 A1 | 11/2005 | Falk et al. |
| 2007/0059539 A1 | 3/2007 | Doehler et al. |
| 2009/0137752 A1 | 5/2009 | Knott et al. |
| 2010/0041910 A1 | 2/2010 | Schubert et al. |
| 2010/0081781 A1 | 4/2010 | Schubert et al. |
| 2011/0042004 A1 | 2/2011 | Schubert et al. |
| 2011/0046305 A1 | 2/2011 | Schubert et al. |
| 2012/0028022 A1 | 2/2012 | Brugger et al. |
| 2012/0029090 A1 | 2/2012 | Brugger et al. |
| 2012/0108730 A1 | 5/2012 | Zander et al. |
| 2012/0190760 A1 | 7/2012 | Henning et al. |
| 2012/0296125 A1 | 11/2012 | Schubert et al. |
| 2013/0041115 A1 | 2/2013 | Knott et al. |
| 2013/0237616 A1 | 9/2013 | Ferenz et al. |

(Continued)

FOREIGN PATENT DOCUMENTS

| | | |
|---|---|---|
| DE | 69831518 T2 | 6/2006 |
| DE | 102012203737 A1 | 9/2013 |

(Continued)

OTHER PUBLICATIONS

International Search Report dated Nov. 27, 2014 issued in PCT/EP2014/054940.

*Primary Examiner* — Terressa Boykin

(74) *Attorney, Agent, or Firm* — Scully, Scott, Murphy & Presser, P.C.

(57) ABSTRACT

The present invention provides specific alkoxylation products, a process for preparing them, compositions which comprise these alkoxylation products, and the use thereof.

15 Claims, No Drawings

(56) References Cited

U.S. PATENT DOCUMENTS

| | | |
|---|---|---|
| 2013/0245304 A1 | 9/2013 | Schubert et al. |
| 2013/0331592 A1 | 12/2013 | Hartung et al. |
| 2014/0256844 A1 | 9/2014 | Henning et al. |
| 2014/0303065 A1 | 10/2014 | Jazkewitsch et al. |
| 2015/0057369 A1 | 2/2015 | Ferenz et al. |

FOREIGN PATENT DOCUMENTS

| | | |
|---|---|---|
| EP | 1036807 A2 | 9/2000 |
| EP | 2093244 A1 | 8/2009 |
| EP | 2415796 A1 | 2/2012 |
| EP | 2415797 A1 | 2/2012 |
| JP | H07-062222 A | 3/1995 |
| JP | H09-012861 A | 1/1997 |
| JP | H09-012863 A | 1/1997 |
| WO | WO 98/47939 A1 | 10/1998 |
| WO | WO 98/52689 A1 | 11/1998 |
| WO | WO 2006/136211 A1 | 12/2006 |
| WO | WO 2010/004038 A1 | 1/2010 |
| WO | WO 2011/000843 A2 | 1/2011 |

* cited by examiner

ALKOXYSILYL-CONTAINING ADHESIVE SEALANTS WITH INTRINSICALLY REDUCED VISCOSITY

The present invention relates to specific alkoxylation products, to a process for preparing them, to compositions which comprise these alkoxylation products, and to the use thereof, more particularly as adhesives and sealants containing alkoxysilyl groups.

In a multiplicity of operational procedures and manufacturing processes, an increasingly important role is being played by the use of adhesives and adhesive sealants, which additionally fulfil a sealing function. Relative to other joining techniques, such as welding or riveting, for example, these techniques offer advantages in terms of weight and costs, but also advantages in the transfer of stress between the components joined.

As compared with the joining of different materials, adhesive bonding has the advantage, moreover, that it is able to compensate the differences in deformation behaviour and in thermal expansion coefficients between the materials, especially when elastic adhesives are used, and hence actually allows such combinations of materials to be joined.

In the literature there are various examples of elastic adhesives. In recent years, in particular, adhesives based on what are called silane-modified polymers have found widespread application by virtue of their universal usefulness. Many examples in the literature address the formulation of adhesive, adhesive sealant and sealant systems for a multiplicity of applications. Mention may be made here, only by way of example, of specifications WO 2006/136211 A1, EP 1036807 B1 and WO 2010/004038 A1, which set out the fundamental concepts of the formulating technologies and formulating constituents that are customary in the art. The base polymer used is customarily a polyether which has been provided, in different processes, with moisture-crosslinking terminal alkoxysilane groups. This product group includes not only the silylated polyethers marketed by the company Kaneka under the name MS Polymer®, but also the so-called silylated polyurethanes (SPUR® products, for example Desmoseal® S, Bayer Materials Science).

The use of polyether backbones in these products is an advantage primarily on account of their low glass transition temperature and the elastic deformation characteristics which are thereby ensured even at low temperatures. However, the silylated polyethers as described in specifications JP 09012863, JP 09012861 and JP 07062222, in particular, on account of their weak intermolecular interaction under service conditions, and the associated reduced intermolecular transmission of forces, do not possess the optimum profile for use in adhesives or sealants.

Silylated polyurethanes as described in DE 69831518 (WO 98/47939 A1) are clearly at an advantage here, since the urethane functions and the urea functions likewise present in specific products allow a high degree of intermolecular force transmission and hence high strengths on the part of the bonds. Silylated polyurethanes as well, however, are hampered by the problems associated with polyurethane, such as the lack of temperature stability and yellowing stability, for example, and also the UV stability, which for certain applications is not sufficient.

Alongside the disadvantages discussed in the two preceding paragraphs, all of the compounds discussed so far have a further property which in many cases is a disadvantage. All discussed products are based on high molecular mass polyether structures of greater than 4000 g/mol, and hence also entail an increased viscosity. In many cases viscosity is so high as to hinder formulation of the respective products.

There is a need, therefore, for alkoxysilyl-modified polymers which retain in unrestricted form the above-described advantages of this class of product, but at the same time exhibit a significantly lower viscosity and thus have more advantageous processing qualities.

There has been no lack of attempts to counteract this weakness, particularly in the silylated polyethers, by means of adroit formulation. For instance, the addition of plasticizers to the silylated base polymer, in particular, is a widespread possibility for generating alkoxysilyl-functional polymers of lower viscosity and easier processing qualities. The profile of properties may be modified, moreover, for the use of reactive diluents, as described in WO 2011/000843 A2 (US 2012/108730 A1).

This approach at a solution, however, has found only limited acceptance, since the formulator who formulates the base polymer, through having to add defined components intended to influence the viscosity of the formulation, is robbed of an important degree of freedom—namely that of modifying the free formulation according to his or her wishes.

It was an object of the present invention, accordingly, to prepare alkoxysilyl-modified polymers which even without assistance from further substances, such as plasticizers or reactive diluents, for example, have viscosities lower than those of comparable known alkoxysilyl-modified polymers. A further object of the present invention was to provide a simple process for preparing such compounds, and also the provision of curable compositions based on such base polymers.

This object has been achieved by means of alkoxysilyl-modified polymers with intrinsically reduced viscosity.

For the purposes of this patent application, alkoxysilyl-modified polymers with intrinsically reduced viscosity are those alkoxysilyl-modified polymers which have a reduced viscosity as set against comparable alkoxysilyl-modified polymers known in the prior art, and whose reduced viscosity does not derive from the addition of one or more auxiliary components to the polymer (after its preparation), but instead whose reduced viscosity is brought about intrinsically, in other words "from the inside". The expression "reduced viscosity" in the context of this patent application embraces all viscosities which are reduced by at least 5%, preferably reduced by at least 10%, based on the viscosity of an alkoxysilyl-modified polymer with intrinsically reduced viscosity when set against comparable alkoxysilyl-modified polymers, under identical measurement conditions. Alkoxysilyl-modified polymers with intrinsically reduced viscosity may be obtained preferably by the process that is described as part of this invention.

Surprisingly it has been found that alkoxysilyl-modified polymers with intrinsically reduced viscosity can be obtained if glycidyl ethers with a branched structural element are used as monomeric units (comonomer) for preparing alkoxysilyl-modified polymers (copolymer). For the process of the invention this means more particularly that during the alkoxylation step of the preparation, glycidyl ethers with branched structural element are added (or incorporated by reaction). The viscosity of the products is significantly reduced by comparison with analogous polymers not containing glycidyl ethers with branched structural element. This has the advantage more particularly that there is no need to supply the polymer of the invention with any further viscosity-reducing auxiliary components in order to obtain a good fluidity, and this reduces costs, significantly simplifies the handling of the polymer and, moreover, allows the polymers of the invention to be formulated more freely. Furthermore, the improved fluidity facilitates the preparation process to a particularly high degree, since here as well, with no need for viscosity-reducing auxiliary components, costs can be reduced and a saving made on a step of addition of viscosity-reducing auxiliary components.

The present invention accordingly provides alkoxylation products with intrinsically reduced viscosity, of the formula (I) as described below.

Furthermore, a process for preparing alkoxylation products with intrinsically reduced viscosity, of the formula (I), is also provided for the present invention.

Likewise provided by the present invention are compositions comprising alkoxylation products with intrinsically produced viscosity, of the formula (I), and also their use, more particularly the use of these alkoxylation products in curable compositions.

The compositions of the invention, the process for preparing them and the use thereof are described by way of example below, without any intention that the invention should be confined to these exemplary embodiments. Where ranges, general formulae or classes of compound are specified below, they should be taken to encompass not only the corresponding ranges or groups of compounds that are explicitly stated, but also all sub-ranges and sub-groups of compounds which can be obtained by extracting individual values (ranges) or compounds. Where the present description cites documents, the intention is that the content of these documents, especially with regard to the subject matter referred to, should in its entirety form part of the disclosure content of the present invention. Where figures in percent are given below, they are, unless otherwise indicated, figures in % by weight. Where averages are given below, they are, unless otherwise indicated, the number average. Where physical properties are specified below, such as viscosities or the like, they are, unless otherwise indicated, the physical properties as measured at 25° C. The viscosity is determined at a temperature of 25° C. with a shear rate of 10 1/s using an MCR 301 Rheometer from Anton Paar.

Alkoxylation products for the purposes of the present invention are those reaction products which can be prepared, for example, by the reaction of a starter carrying one or more OH groups with propylene oxide, one or more glycidyl ethers with branched structural element, one or more alkoxysilyl compounds containing epoxide groups and, depending on embodiment, one or more comonomers, by means of double metal cyanide catalysts (DMC catalysts), in accordance with EP 2093244 (US 2010/0041910) and the aftertreatment methods described in EP 2415796 (US 2012/028022) and EP 2415797 (US 2012/029090), and also the as yet unpublished application text DE 10 2012 203737.

The hydrophilic or hydrophobic nature of the final alkoxysilyl-functional polymer with intrinsically reduced viscosity may be adjusted through the nature and construction of the starter which carriers one or more OH groups, and/or by one or more comonomers introduced during the synthesis.

According to EP 2 093 244, the disclosure content of which in relation to the structures disclosed therein is hereby incorporated in full as part of the present description, it was possible for the first time to prepare alkoxylation products which carry alkoxysilyl groups and which, in contrast to the prior art known up until that point, exhibit alkoxysilyl groups distributed randomly or in block fashion along the polyether chain, and not just located at the chain termini. Furthermore, these compounds are distinguished by an OH group which is terminal as a result of reaction.

The presence of the OH group and the hydrolysis-sensitive alkoxysilyl groups in one molecule is the basis for the intrinsic reactivity of the compounds and ready crosslinkability to form three-dimensional polymer networks. Nevertheless, experiments have also shown that the reactivity of the OH group may be too high to achieve a shelflife sufficient for the requirements imposed on one-component adhesive and sealant formulations. Shelflife in this context means the stability towards crosslinking or gelling of the completed, catalyst-containing formulation on the storage in a standard commercial thick-walled cartridge. The stated compounds include in particular those of the formula (I).

In the context of the present invention the term "alkoxylation products" or "polyethers" encompasses not only polyethers, polyetherols, polyether alcohols and polyetheresterols but also polyethercarbonatols, which optionally are used synonymously with one another. In this context it is not necessary for the expression "poly" to necessarily mean that there is a multiplicity of ether functionalities or alcohol functionalities in the molecule or polymer. Instead, it merely indicates that there are at least repeating units of individual monomer building blocks or else compositions present that have a relatively high molar mass and also, furthermore, a certain polydispersity as well.

The word fragment "poly" in connection with this invention encompasses not only exclusively compounds having at least 3 repeating units of one or more monomers in the molecule, but also, more particularly, those compositions of compounds which have a molecular weight distribution and possess an average molecular weight of at least 200 g/mol. This definition takes account of the fact that, within the field of art in question, such compounds are usually already identified as polymers, even when they do not appear to satisfy a polymer definition along the lines of OECD or REACH Directives.

The different fragments in the formulae (Ia) and (II) below may be subject to a statistical distribution. Statistical distributions may have a block construction, with an arbitrary number of blocks and an arbitrary sequence, or they may be subject to a randomized distribution; they may also be constructed in alternation or else may form a gradient over the chain; in particular, they may also form hybrid forms, where, optionally, groups with different distributions may follow one another. The formulae (I), (Ia) and (II) describe polymers which have a molar weight distribution. Consequently the indices represent the numerical average over all the monomer units.

The index numbers a, b, c, d, e, f, g, h, i, j, k, l, m, n, o, p, q, r, s, t, u, v, w, x and y that are used in the formulae and also the value ranges of the indices indicated, may be understood as average values of the possible statistical distribution of the structures and/or mixtures thereof that are actually present. This applies even to structural formulae which as such, per se, are reproduced exactly, such as for formula (Ia) and (II), for example.

The alkoxylation products of the invention with intrinsically reduced viscosity, comprising the structural elements of the formula (I)

$$M_iD_jT_kQ_lUR_uAP_v \qquad \text{formula (I)},$$

are notable for the fact that the fragments M, D, T and Q are linked not to one another but instead with one another via the groups UR and/or AP, and the groups UR and AP are linked not to one another but instead with one another, correspondingly, via the fragments M, D, T or Q. As far as the indices are concerned:

i=0 to 16, preferably 1 to 12, more preferably 2 to 6
j=0 to 10, preferably 1 to 8, more preferably 2 to 6, especially preferably greater than or equal to 1
k=0 to 6, preferably greater than 0 to 4, more particularly 0.5 to 2,
l=0 to 4, preferably greater than 0 to 3, more particularly 0.5 to 2,
u=0 to 17, preferably 1 to 15, more preferably 2 to 10, more particularly 2 to 8, ally esterified with alcohols such as, for example, methanol, ethanol, propanol, butanol or hexanol,
hydroxyl groups optionally esterified with acids such as acetic acid, butyric acid or (meth)acrylic acid, or the polymers of (meth)acrylic acid,
or an aryl group having 6 to 20 carbon atoms,
or an alkaryl group having 7 to 30, preferably 7 to 20 carbon atoms,
or M is a radical of the formula (Ia) or of the formula (Ib) or of the formula (Ic), with formula (Ia)

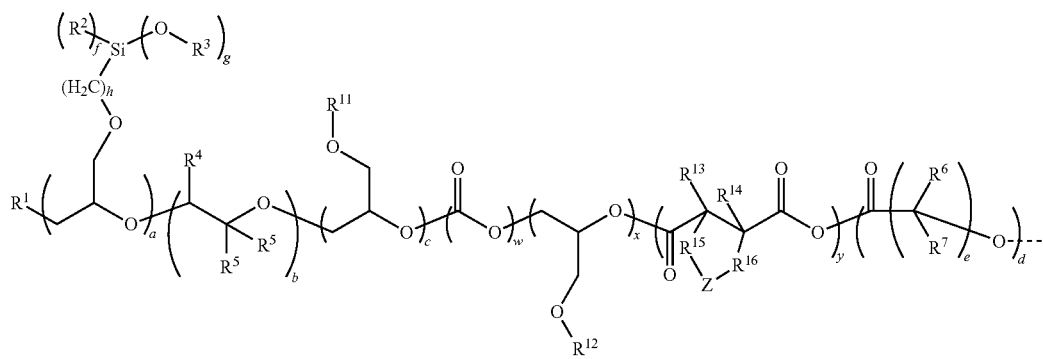

formula (Ia)

v=0 to 6, preferably greater than 0 to 4, more particularly 0.1 to 2.
with the proviso that i+j+k+l>=1,
and the alternatives valid for M are as follows:
M independently at each occurrence is an oxygen-radical-carrying hydrocarbon radical having a minimum numerical molar mass of 88 g/mol, which may optionally be interrupted by heteroatoms, preferably saturated or unsaturated, linear or branched organic hydrocarbon radicals which comprise O, N and/or S as heteroatoms, more preferably a polyether, preferably having 8 to 400 carbon atoms, especially preferably a hydrocarbon radical of the formula

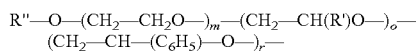

or

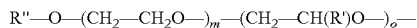

with
m=0 to 200, preferably 8 to 100, more preferably 10 to 50
o=0 to 200, preferably 8 to 100, more preferably 10 to 50
r=0 to 100, preferably 1 to 10,
R'=independently at each occurrence an unsubstituted or optionally substituted—substituted for example by alkyl radicals, aryl radicals or haloalkyl or haloaryl radicals—alkyl or aryl group having a total of 1 to 12 C atoms, preferably a methyl or ethyl group, more preferably a methyl group, and
R"=independently at each occurrence an alkyl group having 1 to 4 C atoms, a group —C(O)—R''' with R'''=alkyl radical, a group —CH$_2$—O—R', an alkylaryl group, such as a benzyl group, for example, the group —C(O)NH—R, the group C(O)—OR', with R' as defined above, preferably a methyl or acetyl radical,
or M is a saturated or unsaturated alkyl group having 1 to 24 carbon atoms, preferably 1 to 14 carbon atoms, whose chain may be interrupted by oxygen and may further carry functional groups such as, for example, carboxyl groups optionwhere
a=0 to 1000, preferably 1 to 500, more preferably greater than 1 to 100, especially preferably 0 to 50
b=0 to 1000, preferably 1 to 500, more preferably greater than 1 to 400, especially preferably 10 to 300
c=0 to 1000, preferably 1 to 100, more preferably greater than 1 to 80, especially preferably 0 to 50
d=0 to 1000, preferably 1 to 100, more preferably greater than 1 to 80, especially preferably 0 to 50
w=0 to 1000, preferably 1 to 200, more preferably greater than 1 to 100 and especially 0 to 70,
x=0 to 1000, preferably 1 to 500, more preferably greater than 1 to 100, especially preferably 0 to 50
y=0 to 500, preferably 1 to 300, more preferably 2 to 200 and especially preferably 0 to 100,
e=1 to 10,
f=0 to 2
g=1 to 3
with the proviso that g+f=3
h=0 to 10, preferably 1 to 6, especially preferably 1, 2 or 3
with the proviso that the groups with the indices a, b, c, d, w, x, and y are freely permutable over the molecule chain, and each of the groups with the indices w and y cannot follow itself or the respective other group
and with the proviso that the various monomer units both of the fragments with the indices a, b, c, d, w, x, and y and of the polyoxyalkylene chain of the substituent R$^1$ may be constructed blockwise among one another, in which case individual blocks may also occur multiply and may have a statistical distribution among one another, or else are subject to a statistical distribution and, moreover, are freely permutable among one another, in the sense of being arranged in any order, with the restriction that each of the groups with the indices w and y cannot follow itself or the respective other group, and where $R^1$=independently at each occurrence a saturated or unsaturated, linear or branched organic hydrocarbon radical which may comprise O, S and/or N as heteroatoms, the hydrocarbon radical preferably contains 1 to 400 carbon atoms, preferably 2, 3 or 4 to 200 carbon atoms, $R^2$=independently at each occurrence an alkyl group having 1 to 8 carbon atoms, more particularly methyl or ethyl, propyl, isopropyl, $R^3$=independently at each occurrence an alkyl group having 1 to 8 carbon atoms, more particularly methyl, ethyl, propyl, isopropyl, $R^4$=independently at each occurrence a hydrogen radical, an alkyl group having 1 to 20 carbon atoms, or an aryl or alkaryl group, preferably hydrogen, methyl, ethyl, octyl, decyl, dodecyl, phenyl, benzyl, more preferably hydrogen, methyl or ethyl, $R^5$=independently at each occurrence a hydrogen radical or an alkyl group having 1 to 8 carbon atoms, preferably hydrogen, methyl or ethyl, especially preferably hydrogen, or $R^4$ and one of the radicals $R^5$ may together form a ring which includes the atoms bonded to $R^4$ and $R^5$, this ring preferably containing 5 to 8 carbon atoms, $R^6$ and $R^7$=independently at each occurrence a hydrogen radical, an alkyl group having 1 to 20 carbon atoms, an aryl or alkaryl group and/or an alkoxy group, preferably a methyl group, $R^{11}$=independently at each occurrence a saturated or unsaturated unbranched alkyl group having 1 to 24 carbon atoms, preferably 1 to 14 carbon atoms, whose chain may be interrupted by oxygen and may further carry functional groups such as, for example, carboxyl groups optionally esterified with alcohols such as, for example, methanol, ethanol, propanol, butanol or hexanol, hydroxyl groups optionally esterified with acids such as acetic acid, butyric acid or (meth)acrylic acid or the polymers of (meth)acrylic acid, or an aryl group having 6 to 20 carbon atoms, or an alkaryl group having 7 to 30, preferably 7 to 20 carbon atoms, preferably a methyl, ethyl, butyl, hexyl, octyl, $C_{12}/C_{14}$, phenyl, cresyl, or benzyl group and/or an allyl group or a (poly)(meth)acrylic ester, more preferably a butyl, $C_{12}/C_{14}$ or benzyl group;

$R^{12}$=independently at each occurrence a saturated or unsaturated, aliphatic or aromatic hydrocarbon radical having 2 to 30 C atoms, more particularly up to 24 C atoms, whose chain may be interrupted by oxygen and may carry further functional groups such as, for example, carboxyl groups or hydroxyl groups, it being possible for the carboxyl groups to be esterified optionally with alcohols, preferably with methanol, ethanol, propanol, butanol or hexanol, and for the hydroxyl groups to be esterified optionally with acids, preferably with acetic acid, neodecanoic acid or butyric acid, and/or an aryl group having 6 to 20 carbon atoms, and/or an alkaryl group having 7 to 30, preferably 10 to 20 carbon atoms, with the proviso that there must be at least one branched structural element present, with branched structural element for the purposes of the present invention encompassing all non-linear substituted or unsubstituted, saturated or unsaturated hydrocarbon radicals which have at least one carbon atom which is bonded to at least 3 other carbon atoms, it being possible for the hydrocarbon radicals of the branched structural element to be interrupted optionally by heteroatoms, with the restriction that aromatic and aliphatic rings should not be considered to constitute branched structural element;

preferably $R^{12}$ is an isobutyl, tert-butyl, 2-pentyl, 3-pentyl, 2-methylbutyl, 3-methylbutyl, 2-methyl-2-butyl, 3-methyl-2-butyl, 2,2-dimethylpropyl, 2-ethylhexyl, 2-propylheptyl, 2-butyloctanyl, 2-methylundecyl, 2-propylnonyl, 2-ethyldecyl, 2-pentylheptyl, 2-hexyldecyl, 2-butyltetradecyl, 2-dodecylhexadecyl, 2-tetradecyloctadecyl, 3,5,5-trimethylhexyl, isononanyl, isotridecyl, isomyristyl, isostearyl, triphenylmethyl, $C(O)—(CH_2)_5—C—(CH_3)_3$ (radical of neodecanoic acid) or 2-octyldodecyl group, more preferably an isobutyl, tert-butyl, 2-ethylhexyl-, 3,5,5-trimethylhexyl, isononanyl, isotridecyl, $C(O)—(CH_2)_5—C—(CH_3)_3$ (radical of neodecanoic acid) group, very preferably an isobutyl, —$C(O)—(CH_2)_5—C—(CH_3)_3$ (radical of neodecanoic acid), 3,5,5-trimethylhexyl, isononanyl, isotridecyl or 2-ethylhexyl group, especially isobutyl, $C(O)—(CH_2)_5—C—(CH_3)_3$ (radical of neodecanoic acid, obtainable for example as Cardura E 10 P from Momentive) or 2-ethylhexyl group, and, if $R^{11}$ already contains branching based on methacrylic acid or on polymers of methacrylic acid, there must be at least one further branching as per $R^{12}$ present in order to allow the viscosity effects of the invention to be obtained;

$R^{13}$, $R^{14}$=independently at each occurrence hydrogen and/or an organic radical, preferably alkyl, alkenyl, alkylidene, alkoxy, aryl and/or aralkyl groups, or, optionally, $R^{13}$ and/or $R^{14}$ may also be absent, and, if $R^{13}$ and $R^{14}$ are absent, there is a C=C double bond present instead of the radicals $R^{13}$ and $R^{14}$, the bridging fragment Z may be present or absent;

if the bridging fragment Z is absent, then $R^{15}$ and $R^{16}$=independently at each occurrence hydrogen and/or an organic radical, preferably alkyl, alkenyl, alkylidene, alkoxy, aryl and/or aralkyl groups, and, if one of the radicals $R^{13}$ or $R^{14}$ is absent, the respective germinal radical (i.e. $R^{15}$ if $R^{13}$ is absent, and $R^{16}$ if $R^{14}$ is absent) is an alkylidene radical, preferably methylidene (=$CH_2$);

if the bridging fragment Z is present, then $R^{15}$ and $R^{16}$=hydrocarbon radicals which are bridged cycloaliphatically or aromatically via the fragment Z, with Z representing a divalent alkylene or alkenylene radical, which may be further substituted, the fragment with the index y may be obtained, for example, by the incorporation of cyclic anhydrides; preferred cyclic anhydrides are succinic anhydride, maleic anhydride, itaconic anhydride, glutaric anhydride, adipinic anhydride, citraconic anhydride, phthalic anhydride, hexahydrophthalic anhydride and trimellitic anhydride and also polyfunctional acid anhydrides such as pyromellite dianhydride, benzophenone-3,3',4,4'-tetracarboxylic dianhydride, 1,2,3,4-butanetetracarboxylic dianhydride or radically polymerized homopolymers or copolymers of maleic anhydride with ethylene, isobutylene, acrylonitrile, vinylacetate or styrene; particularly preferred anhydrides are succinic anhydride, maleic anhydride, itaconic anhydride, glutaric anhydride, adipic anhydride, citraconic anhydride, phthalic anhydride, hexahydrophthalic anhydride;

with formula (Ib)

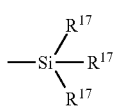

with
$R^{17}$=independently at each occurrence a linear or branched, saturated or unsaturated, optionally further-substituted alkyl group having 1 to 30 carbon atoms, or an aryl or alkaryl group, preferably methyl, ethyl, octyl, decyl, dodecyl, phenyl, benzyl, more preferably methyl or ethyl,
with formula (Ic):

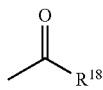

with $R^{18}$ independently at each occurrence a divalent linear or cyclic, saturated or unsaturated alkyl group, which may be substituted, preferably a methyl, ethyl, propyl or isopropyl group, or
an aryl group, preferably a phenyl group, or
an at least disubstituted aryl group, which may preferably carry at least one further carboxylic acid function, preferably acetate radical, propionate radical, phthalic acid radical, hexahydrophthalic acid radical or maleic acid radical,
and, if j, k and l each=0, then M must=formula (Ia);
and where, for the fragments D, T and Q:
D is a polyether radical PE with t being 2,
T is a polyether radical PE with t being 3 and
Q is a polyether radical PE with t being 4
where
PE is independently at each occurrence a polyether radical of the formula $-(D^A)_t-D^X$,
where t=2 to 4, preferably 2 to less than 4, and
$D^X$ is a t-valent functional, saturated or unsaturated, linear or branched organic hydrocarbon radical, which may comprise O, S, Si and/or N as heteroatoms, and each of the radicals $D^A$ is bonded covalently to the radical $D^X$;
the hydrocarbon radical preferably contains 8 to 1500 carbon atoms,
the carbon chain of the hydrocarbon radical is preferably interrupted by oxygen atoms,
the hydrocarbon radical preferably contains substituents containing silicon atom,
the substituents containing silicon atom are preferably alkoxysilyl groups,
the hydrocarbon radical interrupted by oxygen atoms is preferably a polyoxyalkylene radical, polyether radical and/or polyether alkoxy radical,
or $D^X$ may be a singularly or multiply fused phenolic group,
or more preferably $D^X$ may be a t-valent radical of a t-tuply hydroxylated alcohol, polyetherol, polyesterol, siloxane, perfluorinated polyetherol, (poly)urethane or saccharide, preferably OH-functional polyethers, polyesters, polycarbonates, polyetheresters or perfluorinated polyethers and copolymers thereof, especially preferably OH-functional polyethers or polyesters,
and where $D^A$ is a fragment of the formula (II)

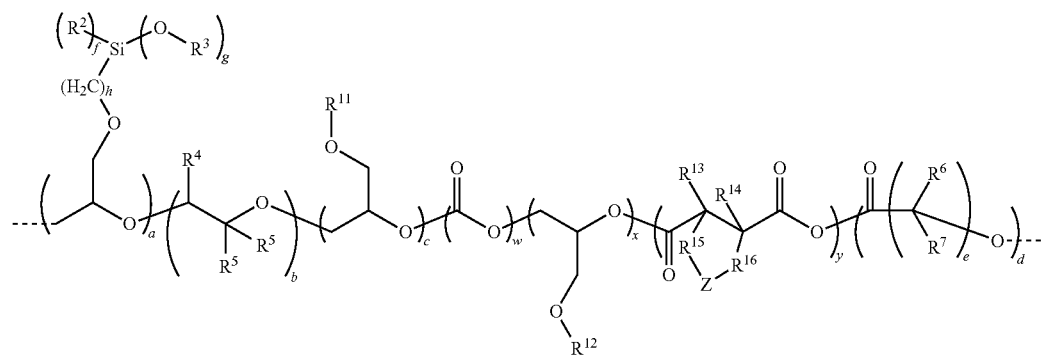

formula (II)

with a to h, w, x and y and $R^2$ to $R^{16}$ independently at each occurrence defined as in formula (Ia),
with the proviso that the sum of all the indices a from formula (Ia) and formula (II) must be greater than or equal to 1,
and where the sum of all indices x from formula (Ia) and formula (II) must be greater than or equal to 1.
In one particularly preferred embodiment, the polyether radicals D may be polyethers prepared starting from a dihydroxy-substituted compound, the polyether radicals T may be polyethers started from a trihydroxy-substituted compound, the polyether radicals may be polyethers prepared starting from a tetrahydroxy-substituted compound, and/or the fragment M may be a polyether prepared starting from a monohydroxy-substituted compound.
UR independently at each occurrence are identical or different divalent radicals of the form $-U-D^C-U-$,
or a monovalent radical of the form $D^D-U-$,
or a trivalent radical of the form $D^E U_3$,
or a tetravalent radical of the form $D^F U_4$,
where U is a —C(O)—NH— group which is bonded via the nitrogen to $D^C$, $D^E$, $D^F$ or $D^D$, and
$D^C$ independently at each occurrence is a divalent substituted or unsubstituted, linear or branched, saturated or unsaturated hydrocarbon radical having 1 to 30 carbon atoms, selected from alkyl, alkenyl, aryl or alkaryl radicals, which may optionally be interrupted by heteroatoms such as O, N and/or S, or an aryl or alkaryl group; preferably $D^C$ is a divalent hydrocarbon radical having 6-30 carbon atoms; especially preferably D' is an isophorone radical, $D^E$ independently at each occurrence is a trivalent substituted or unsubstituted, linear or branched, saturated or unsaturated hydrocarbon radical having 1 to 30 carbon atoms, selected from alkyl, alkenyl, aryl or alkaryl radicals, which may optionally be interrupted by heteroatoms such as O, N and/or S, and which may optionally carry further functional groups, such as allophanate groups or biuret groups, for example, and $D^E$ independently at each occurrence is a tetravalent substituted or unsubstituted, linear or branched, saturated or unsaturated hydrocarbon radical having 1 to 30 carbon atoms, selected from alkyl, alkenyl, aryl or alkaryl radicals, which may optionally be interrupted by heteroatoms such as O, N and/or S, and which may optionally carry further functional groups, such as allophanate groups or biuret groups, for example, and $D^D$ independently at each occurrence is a monovalent linear or branched, saturated or unsaturated hydrocarbon radical having 1 to 30 carbon atoms, selected from alkyl, alkenyl, aryl or alkaryl radicals, which may optionally be interrupted by heteroatoms such as O, N and/or S and may also be further substituted, for example with alkyl-trialkoxysilane or alkylalkyl-dialkoxysilane groups, the hydrocarbon radical having preferably 1 to 30, more preferably from 2 to 18 and very preferably from 3 to 10 carbon atoms, and more particularly a methyl, ethyl, propyl or butyl radical, 3-isocyanato-propyltrimethoxysilane, 3-isocyanatopropyltriethoxysilane; preferably $D^D$ is a monovalent hydrocarbon radical having 4-20 carbon atoms, more preferably methyl, ethyl, propyl, isopropyl, butyl, isobutyl, octyl, decyl, dodecyl, phenyl, tolyl, benzyl, isopropylphenyl or stearyl group, more preferably methyl, ethyl, propyl, isopropyl, butyl, phenyl, tolyl, isopropylphenyl or stearyl group; very preferably $D^D$ is a butyl radical AP independently at each occurrence are identical or different radicals of the general formula (IIIa), (IIIb) or (IIIc)

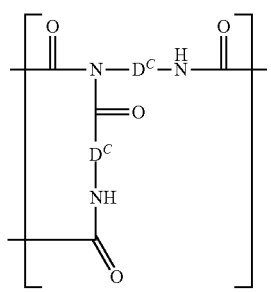

(IIIa)

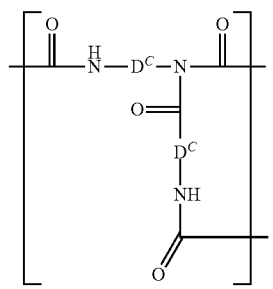

(IIIb)

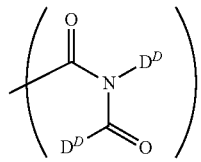

(IIIc)

The fragment UR may be termed a urethane unit. The fragment AP may be termed an allophanate unit.

Where polyisocyanates with the structural units $D^E$ and/or $D^F$ are used, the resulting structures are of arbitrary complexity, analogous to formula (IIIa) and/or (IIIb), and accordingly a pictorial representation has deliberately not been included. Instead, the skilled person is able to image, illustratively, that the three urethane units that are bonded to $D^E$, and/or the four urethane units which are bonded to $D^F$, have all or in part undergone further reaction to form allophanate structural units, as shown in the top part of the formulae (IIIa) and (IIIb).

The radical $R^{11}$ may carry further functional groups such as, for example, (meth)acrylic acid or polymers of (meth)acrylic acid. It is therefore possible for hydroxyl groups optionally present to be esterified with acrylic acid and/or methacrylic acid. The double bonds of the (meth)acrylic acid are polymerizable, e.g. radically e.g. with UV induction.

The polymerization of the (meth)acrylic groups may take place after the preparation of the polyether. It may also be carried out with the alkoxylation products of the invention, with the products of the process of the invention, and also after use in accordance with the invention.

$D^X$ is a t-valent functional, organic hydrocarbon radical. A feature of the functionality is that it is capable of initiating polymerization of alkylene oxides, of cyclic acid anhydrides and/or of acid lactones with ring opening. In this sense it represents a starting compound. The polymerization may optionally take place catalytically. Serving as catalysts may be acids, bases and metal-atom-containing complexes. Preference is given to what are called DMC catalysts. The common rules of addition reaction that are known to the skilled person apply here—for example, that the starter reacts preferentially on the less substituted side of the alkylene oxides or on the carbonyl carbon of the lactones. This corresponds, in the case of the formula (II), to the left-side of the respective fragment in the formula.

The OH functions of the alkoxylation products may, where pursued, react with isocyanate functions to form urethanes. Accompanying this reaction in general are a series of secondary reactions (e.g. addition reaction of an isocyanate group with a urethane unit to form the allophanate group), the extent of which may be controlled through the choice of the reaction conditions.

Preference is given to alkoxylation products of the invention with intrinsically reduced viscosity of the formula (I) in which the indices l and j independently of one another are 1, 2, 3 or 4 and u=(j−1) to (j+1) and/or x in the formulae (Ia) and (II) is in total greater than 1, and also k and l are zero. Especially preferred are alkoxylation products of the invention of intrinsically reduced viscosity of the formula (I) in which the index x in the formulae (Ia) and (II) is in total greater than or equal to 2, preferably greater than or equal to 3 and/or a is preferably greater than or equal to 1 and/or b in total is greater than or equal to 2, preferably 8 to 400, more preferably 10 to 300, and/or $R^{12}$ is an alkyl chain having at least one branched structural element and having 4 to 20 carbon atoms, preferably having 5 to 16 carbon atoms, more preferably having 6 to 12 carbon atoms, since these alkoxylation products exhibit particularly outstanding fluidity and facilitate the preparation process to an especially high degree, and/or alkoxylation products of the invention with intrinsically reduced viscosity of the formula (I) in which other of the preferred parameters set out hereinbelow are fulfilled: preference is given to alkoxylation products with intrinsically reduced viscosity of the formula (I) where the indices of the formula (I) k and l=0, j=0 to 2, i=2, u=j+1 and v=0 and the indices of the formulae (Ia) and (II) x are in total greater than or equal to 2, a is in total greater than or equal to 1 and b is in total 2 to 300. Preference is also given to alkoxylation products with intrinsically reduced viscosity of the formula (I) where the indices of the formula (I) i and j=0 and k+l≥1 and the indices of the formulae (Ia) and (II) a is in total greater than or equal to 1 and b is in total 2 to 300. Further preferred are alkoxylation products of intrinsically reduced viscosity of the formula (I) where at least one alkoxylation product of the formula (I) is present with, in each case independently of one another, i, j, k or l being 1 and v and u=0. Preferred, moreover, are alkoxylation products of intrinsically reduced viscosity of the formula (I) where the indices of the formula (I) j, k, l and v=0, i=3 to 4 and u=1. The alkoxylation products of the invention with intrinsically reduced viscosity of the formula (I), and more particularly the above-recited preferred embodiments of the alkoxylation products, are notable in that the viscosity of the alkoxylation product of the formula (I) is lowered by at least 10%, preferably by at least 15%, more preferably by at least 20%, 25%, 30%, 40% or 50%, relative to the otherwise identical alkoxylation product with index x in the formulae (Ia) and (II)=0.

Particularly preferred are alkoxylation products/polymers of the polyethers PE which are dihydroxy-functional. Particularly preferred are divalent polyethers PE prepared from propylene oxide (PO), 3-glycidyloxypropyltriethoxysilane (GLYEO) and a glycidyl ether with branched structural element (e.g. 2-ethylhexyl glycidyl ether) and optionally, furthermore, ethylene oxide (EO) and/or glycidyl ethers without branched structural elements. Especially preferred are dihydroxy-functional polyethers PE prepared exclusively from 2-ethylhexyl glycidyl ether, GLYEO and PO or prepared exclusively from 2-ethylhexyl glycidyl ether, GLYEO and PO and EO.

The starter $D^x$ is preferably a compound selected from polyethylene oxides, polyesters, polycarbonates, polycarbonate polyols, polyester polyols, polyether esters, polyetherols, polyethercarbonates, polyamides, polyurethanes and sugar-based alkoxylates, which may optionally have one or more alkoxysilyl groups. Preference is given to those compounds $D^x$ having at least one OH group and a melting point of less than 150° C.; more preferably, $D^x$ is OH-terminated and possesses a melting point of less than 100° C. and a molar mass between 500-8000 g/mol; especially preferred are starters $D^x$ which posses 2 to 6 OH-terminated ends and possess a melting point of less than 90° C. and a molar mass of 500-4000 g/mol. Preferred starters $D^x$ are hydroxyl-terminated polyethers prepared by a reaction of ethylene oxide optionally in combination with propylene oxide. All stated starters can also be used in any desired mixtures. Particularly preferred starters $D^x$ are hydroxyl-containing polyesters such as, for example, Desmophen® 1700 (Bayer), polyester polyols, such as Stepanpol® PS-2002 (Stepan Company), Priplast 1838 (Croda) and polycarbonates, for example Oxymer® M112 (Perstorp), Desmophen® C1200 (Bayer), Desmophen® C2200 (Bayer), and also various dendritic OH-terminated polymers, such as, for example, Boltorn® H2004 (Perstorp). Especially preferred starters are polypropylene glycols and polytetrahydrofurans (available in diverse molar weights as Terathane® (Invista) and PolyTHF® (BASF) e.g. PolyTHF 2000).

Particularly preferred are alkoxylation products of the invention with intrinsically reduced viscosity of the formula (I) in which the fragment M has no alkoxysilyl and/or alkylsilyl groups. Further particularly preferred are alkoxylation products of the invention which, based on the individual molecule, have on a numerical average more than one alkoxysilyl group per group UR.

Further preferred are alkoxylation products of the invention, of the formula (I), in which k, l, v=zero. Further preferred are alkoxylation products in which the index i is 2, the index j is 1 to 3 and the index u is 2 to 4.

In an especially preferred embodiment the alkoxylation products of the invention are those of the formula (I) with
i=2 to 10, preferably greater than 2 to 6, more preferably 2
j=0 to 6, preferably 1, 2, 3 or 4
k=0, 1 or 2, preferably 0
l=0, 1 or 2, preferably 0
u=(1*j)+(2*k)+(3*l)+1
v=0
where M corresponds to formula (Ia) with
 a=0 to 50, preferably greater than 1 to 20, more preferably 0 to 4,
 b=10 to 500, more preferably 12 to 250
 c=0 to 20, preferably 0 to 4
 d=0 to 20, preferably 0
 w=0 to 20, preferably 0
 x=0 to 50, preferably greater than 0 to 20, more preferably 1 to 10, very preferably greater than 1 to 8, especially preferably 0 to 4
 y=0 to 20, preferably 0,
 e=1 to 10,
 f=0 to 2
 g=1 to 3
 with the proviso that g+f=3
 h=1, 2 or 3 and
 $R^1$=independently at each occurrence a saturated or unsaturated, linear or branched organic hydrocarbon radical, which may comprise O, S and/or N as heteroatoms; the hydrocarbon radical preferably contains 1 to 400 carbon atoms, preferably 2, 3 or 4 to 200 carbon atoms; more preferably an alkyl radical having 2 to 12, preferably having 3 to 6 carbon atoms, more preferably a butyl radical,
where for formula (II):
 a=1 to 50, preferably greater than 1 to 20, more preferably 2 to 10, especially 0 to 6,
 b=10 to 700, more preferably 12 to 350,
 c=0 to 20, preferably 0
 d=0 to 20, preferably 0 w=0 to 20, preferably 0
x=0 to 50, preferably greater than 0 to 20, more preferably 1 to 10, very preferably 2 to 8,
y=0 to 20, preferably 0,
e=1 to 10,
f=0 to 2
g=1 to 3
with the proviso that g+f=3
h=1, 2 or 3
and where for formula (Ia) and formula (II): (radicals not exclusively stated here are as defined above)
$R^2$=independently at each occurrence a methyl or ethyl, propyl, or isopropyl group, preferably a methyl or ethyl group
$R^3$=independently at each occurrence a methyl or ethyl, propyl or isopropyl group, preferably a methyl or ethyl group
$R^4$=independently at each occurrence hydrogen or a methyl, ethyl, octyl, decyl, dodecyl, phenyl or benzyl group, more preferably hydrogen or a methyl or ethyl group,
$R^5$=independently at each occurrence hydrogen, methyl or ethyl, especially preferably hydrogen,
$R^{11}$=independently at each occurrence butyl, $C_{12}/C_{14}$ alkyl, phenyl, cresyl or benzyl group;
$R^{12}$=independently at each occurrence an optionally substituted alkyl chain having at least one branched structural element and having 4 to 20 carbon atoms, preferably having 5 to 16 carbon atoms, more preferably having 6 to 12 carbon atoms, preferably selected from isobutyl, tert-butyl, 2-pentyl, 3-pentyl, 2-methylbutyl, 3-methylbutyl, 2-methyl-2-butyl, 3-methyl-2-butyl, 2,2-dimethylpropyl, 2-ethylhexyl, 2-propylheptyl, 2-butyloctanyl, 2-methylandecyl, 2-propylnonyl, 2-ethyldecyl, 2-pentylheptyl, 2-hexyldecyl, 2-butyltetradecyl, 2-dodecylhexadecyl, 2-tetradecyloctadecyl, 3,5,5-trimethylhexyl, isononanyl, isotridecyl, isomyristyl, isostearyl, triphenylmethyl, C(O)—$(CH_2)_5$—C—$(CH_3)_3$ (radical of neodecanoic acid) or 2-octyldodecyl group, more preferably an isobutyl, tert-butyl, 2-ethylhexyl, 3,5,5-trimethylhexyl, isononanyl, isotridecyl, C(O)—$(CH_2)_5$—C—$(CH_3)_3$ (radical of neodanoic acid) group, very preferably an isobutyl, C(O)—$(CH_2)_5$—C—$(CH_3)_3$ (radical of neodanoic acid, obtainable for example as Cardura E 10 P from Momentive) or 2-ethylhexyl group,
and where for UR:
UR independently at each occurrence are identical or different divalent radicals of the form -U-$D^C$-U-, with $D^C$ independently at each occurrence being a divalent substituted or unsubstituted, linear or branched, saturated or unsaturated hydrocarbon radical having 1 to 30 carbon atoms; especially preferably $D^o$ is an isophorone radical;
since these alkoxylation products exhibit particularly outstanding fluidity and also facilitate the preparation process to an unusually high degree.

EP 2 093 244 describes the possibility of selective alkoxylation of alkoxysilanes carrying epoxide functions, in an advantageous way, in the presence of known double metal cyanide catalysts. With the process disclosed therein, the possibility arises of performing the single and/or multiple alkoxysilyl-group modification of polyoxyalkylene compounds in a reproducible way, not only terminally but also within the sequence of oxyalkylene units. The disclosure content of EP 2 093 244 is considered in its entirety to be part and parcel of this description.

The products of the invention are preferably obtainable via an alkoxylation process using double metal cyanide catalysts (DMC catalysts).

With preference the alkoxylation products of the invention are obtainable by reacting with one another at least one glycidyl ether of the general formula (IVb)

(IVb)

where
$R^{12}$=independently at each occurrence a saturated or unsaturated, substituted or unsubstituted aliphatic or aromatic hydrocarbon radical having 2 to 30 C atoms, with the proviso that there must be at least one branched structural element present; preferably $R^{12}$ is independently at each occurrence an optionally substituted alkyl chain having at least one branched structural element and having 4 to 20 carbon atoms, preferably having 5 to 16 carbon atoms, more preferably having 6 to 12 carbon atoms, preferably selected from isobutyl, tert-butyl, 2-pentyl, 3-pentyl, 2-methylbutyl, 3-methylbutyl, 2-methyl-2-butyl, 3-methyl-2-butyl, 2,2-dimethylpropyl, 2-ethylhexyl, 2-propylheptyl, 2-butyloctanyl, 2-methylandecyl, 2-propylnonyl, 2-ethyldecyl, 2-pentylheptyl, 2-hexyldecyl, 2-butyltetradecyl, 2-dodecylhexadecyl, 2-tetradecyloctadecyl, 3,5,5-trimethylhexyl, isononanyl, isotridecyl, isomyristyl, isostearyl, triphenylmethyl, C(O)—$(CH_2)_5$—C—$(CH_3)_3$ (radical of neodecanoic acid) or 2-octyldodecyl group, more preferably an isobutyl, tert-butyl, 2-ethylhexyl, 3,5,5-trimethylhexyl, isononanyl, isotridecyl, C(O)—$(CH_2)_5$—C—$(CH_3)_3$ (radical of neodanoic acid) group, very preferably an isobutyl, C(O)—$(CH_2)_5$—C—$(CH_3)_3$ (radical of neodanoic acid, obtainable for example as Cardura E 10 P from Momentive) or 2-ethylhexyl group,
and at least one glycidyl ether of the general formula (V)

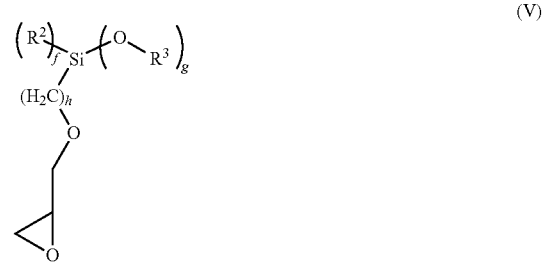

(V)

with
f=0 to 2
g=1 to 3
with the proviso that g+f=3 and g is at least 1,
h=0 to 10 and
$R^2$=independently at each occurrence an alkyl group having 1 to 8 carbon atoms,
$R^3$=independently at each occurrence an alkyl group having 1 to 8 carbon atoms,
and at least one further polymerizable monomer which is different from the formulae (IVb) and (V), preferably selected from alkylene oxides, glycidyl ethers, lactones, cyclic dicarboxylic anhydrides and mixtures thereof, more particularly alkylene oxides, particularly preferably monomers which in the completed product lead to fragments with the index b, c, d, w and/or y, especially preferably fragments with the index b, of the formulae (Ia) and (II).

Useful alkylene oxide compounds which lead to the fragments with the index b as indicated in the formulae (Ia) and (II) are, for example, ethylene oxide, 1,2-epoxypropane (propylene oxide), 1,2-methyl-2-epoxypropane (isobutylene oxide), epichlorohydrin, 2,3-epoxy-1-propanol, 1,2-epoxybutane (butylene oxide), 2,3-epoxybutane, 2,3-dimethyl-2,3-epoxybutane, 1,2-epoxypentane, 1,2-methyl-3-ethoxypentane, 1,2-epoxyhexane, 1,2 epoxy-cyclohexane, 1,2-epoxyheptane, 1,2-epoxyoctane, 1,2-epoxynonane, 1,2-epoxydecane, 1,2-epoxyundecane, 1,2-epoxydodecane, styrene oxide, 1,2-epoxycyclopentane, 1,2-epoxy-cyclohexane, vinylcyclohexene oxide, (2,3-epoxypropyl)benzene, vinyloxirane, 3-phenoxy-1,2-epoxypropane, 2,3-epoxymethyl ether, 2,3-epoxyethyl ether, 2,3-epoxyisopropyl ether, (3,4-epoxybutyl) stearate, 4,5-epoxypentyl acetate, 2,3-epoxypropane methacrylate, 2,3-epoxypropane acrylate, gylcidyl butyrate, methyl glycidate, ethyl 2,3-epoxybutanoate, 4-(tri-methylsilyl)butane 1,2-epoxide, 4-(triethylsilyl) butane 1,2-epoxide, 3-(perfluoromethyl)propene oxide, 3-(perfluoroethyl)propene oxide, 3-(perfluorobutyl)propene oxide, 4-(2,3-epoxypropyl)morpholine, 1-(oxiran-2-ylmethyl)pyrrolidin-2-one. Employed with preference are ethylene oxide, propylene oxide and butylene oxide. Employed with particular preference are ethylene oxide and propylene oxide.

A non-exhaustive collection of lactones which, by ring opening, lead to the fragments with the index d that are indicated in formulae (Ia) and (II), include valerolactones or caprolactones, which may be both unsubstituted or substituted by alkyl groups, preferably methyl groups. Preference is given to using ε-caprolactone or δ-valerolactone, more particularly ε-caprolactone.

As saturated, unsaturated or aromatic cyclic dicarboxylic anhydrides which by reactive incorporation lead to the fragments with the index y, preference is given to using succinic anhydride, oct(en)yl, dec(en)yl- and dodec(en)yl succinic anhydride, maleic anhydride, phthalic anhydride, hexahydro-, tetrahydro-, dihydro-, methylhexahydro- and methyltetrahydrophthalic anhydride. During the alkoxylation process, the respective anhydride monomers may be copolymerized in any order and in variable amount, in succession or in temporal parallel with the epoxide feed, with ring opening, to form polyether esters. Mixtures of the stated anhydrides can also be used. It is possible, furthermore, to add the anhydrides to the starter $D^X$ before the start of reaction and to forego metered addition as described above. It is, however, also possible both to add anhydrides to the starter $D^X$ and to meter in further anhydride in the further course of the reaction, during the alkoxylation. Particularly preferred for use are succinic anhydride, maleic anhydride, phthalic anhydride and hexahydrophthalic anhydride, more particularly maleic anhydride and hexahydrophthalic anhydride.

Glycidyl ethers which lead to the fragments having the index c that are indicated in the formulae (Ia) and (II) conform to the general formula (IVa); those which lead to the fragments with the index x conform to the general formula (IVb).

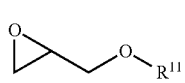
(IVa)

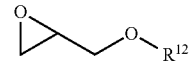
(IVb)

with $R^{11}$ and $R^{12}$ as defined above.

Preferably $R^{11}$ corresponds to a methyl, ethyl, hexyl, octyl, $C_{12}/C_{14}$, phenyl, cresyl or benzyl group and/or to an allyl group, and more preferably it is an allyl, cresyl or $C_{12}/C_{14}$ group, more particularly a $C_{12}/C_{14}$ group. Employed with especial preference is $C_{12}$-$C_{14}$ glycidyl ether (available for example as Ipox® RD 24).

The process of the invention uses preferably compounds of the formula (IVb) with $R^{12}$=alkyl chains having 4 to 20 carbon atoms, preferably having 5 to 16 carbon atoms, more preferably having 6 to 12 carbon atoms, or isopropyl, isobutyl, tert-butyl, 2-ethylhexyl. It is possible, furthermore, to use glycidyl ethers which may be obtained, for example, from the reaction of oxo-process alcohols or Guerbet alcohols with epichlorohydrin. Oxo-process alcohols known to the skilled person carry usually 2 to 4 methyl groups on the alkyl chain, as branches. The Guerbet alcohols likewise known to the skilled person usually have an alkyl branch in position 2; named examples include the aforementioned 2-ethylhexanol and also 2-butyloctanol, 2-hexyldecanol and/or 2-octyldodecanol.

Exemplary branched alcohols of the two aforementioned classes of product, whose radicals on the alkyl group correspond to the radical $R^{12}$ in formula (IVb), are given hereinafter. It is possible advantageously to use isobutanol, tert-butanol, 2-pentanol, 3-pentanol, 2-methylbutanol, 3-methylbutanol, 2-methyl-2-butanol, 3-methyl-2-butanol, 2,2-dimethylpropanol, 2-ethylhexanol, 2-propylheptanol, 2-butyloctanol, 2-methylundecanol, 2-propylnonanol, 2-ethyldecanol, 2-pentylheptanol, 2-hexyldecanol, 2-butyltetradecanol, 2-dodecylhexadecanol, 2-tetradecyloctadecanol, 3,5,5-trimethylhexanol, isononanol, isotridecyl alcohol, isomyristyl alcohol, isostearyl alcohol, triphenylmethanol or 2-octyldodecanol.

Employed with particular preference are glycidyl ethers of formula (IVb) with $R^{12}$=isobutyl, tert-butyl, 3,5,5-trimethylhexyl, isononanyl, isotridecyl, —C(O)—(CH$_2$)$_5$—C—(CH$_3$)$_3$ (radical of neodecanoic acid, available for example as Cardura E 10 P from Momentive), 2-ethylhexyl or 2-octyldodecyl.

Employed with special preference are glycidyl ethers of formula (IVb) with $R^{12}$=isobutyl, —C(O)—(CH$_2$)$_5$—C—(CH$_3$)$_3$ (radical of neodecanoic acid, obtainable for example as Cardura E 10 P from Momentive), 2-ethylhexyl (available e.g. as Grilonit RV 1807, Grilonit RV 1807 4.1 or IPDX RD 17); very particular preference is given to using, as glycidyl ethers of the general formula (IVb), 2-ethylhexyl glycidyl ether (available e.g. as Grilonit RV 1807, Grilonit RV 1807 4.1 or IPDX RD 17).

As glycidyl ethers it is also possible to use polyfunctional glycidyl ethers such as 1,4-butanediol diglycidyl ether, 1,6-hexanediol diglycidyl ether, cyclohexanedimethanol diglycidyl ether, neopentyl glycol diglycidyl ether, polyethylene glycol diglycidyl ether, polypropylene glycol diglycidyl ether, polyglycerol-3 glycidyl ether, glycerol triglycidyl ether, trimethylolpropane triglycidyl ether or pentaerythritol tetraglycidyl ether, and by this means it is also possible to introduce branched structural elements into the final alkoxylation product of the formulae (I) in accordance with the formulae (Ia) and (II).

Depending on the epoxide-functional alkoxysilane used and any further monomers employed, it is possible to prepare modified alkoxylation products of formula (I), and also mixtures of arbitrary construction.

Useful alkylene oxide compounds which lead to the fragments with the index a that are indicated in the formulae (Ia) and (II) may correspond to the general formula (V)

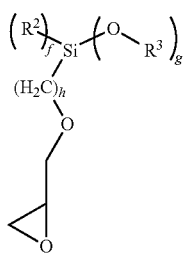

with f, g, h, $R^2$ and $R^3$ as defined above.

A non-exhaustive collection of alkoxysilanes substituted by epoxide groups, of formula (V), includes, for example, 3-glycidyloxypropyltrimethoxysilane, 3-glycidyloxypropyltriethoxysilane, 3-glycidyloxypropyltripropoxysilane, 3-glycidyloxypropyltriisopropoxysilane, bis(3-glycidyloxypropyl)dimethoxysilane, bis(3-glycidyloxypropyl)diethoxysilane, 3-glycidyl-oxyhexyltrimethoxysilane, 3-g lycidyloxyhexyltriethoxysilane, 3-g lycidyloxypropylmethyldimethoxysilane, 3-glycidyloxypropylethyldiethoxysilane.

As compounds of the formula (V) in the process of the invention, preference is given to using 3-glycidyloxypropyltrimethoxy- or -triethoxysilane, which are available, for example, under the trade names DYNASYLAN® GLYMO and DYNASYLAN® GLYEO (trademarks of Evonik Degussa GmbH), respectively. Particularly preferred is the use of glycidyloxypropyltriethoxysilane, since in this way it is possible to avoid methanol emissions in the case of application as moisture-crosslinking components.

The compounds which supply the radical $R^1$ of the formula (Ia) are understood in the context of the present invention to be substances which may be the end group of the final alkoxylation product with intrinsically reduced viscosity.

The radical $R^1$ comes preferably from a hydroxyl-containing compound of the formula (VI)

$$R^1\text{—H} \quad (VI)$$

where $R^1=R^X$—O— and $R^x$=organic radical which may have further OH groups and may optionally have one or more alkoxysilyl groups, and hence in which the hydrogen shown in formula (VI) is part of the hydroxyl group. Preference is given to using compounds having molar masses of 31 to 10 000 g/mol, more preferably 50 to 2000 g/mol, more particularly 60 to 200 g/mol. These compounds may be used in any desired mixtures with one another or as pure substance. It is also possible to use hydroxyl compounds substituted pendently with substituents containing alkoxysilyl groups, or substituted directly by alkoxysilyl groups, such as the silyl polyethers described in EP 2093244, as starting compounds.

In one particular embodiment of the present invention it may be possible to use the compounds of the type $R^1$—H as starters for an alkoxylation, with the consequent formation of alkoxylation products, more particularly of the formula (Ia), obtained by the inventive addition reaction of epoxide-functional monomers and optionally further comonomers.

The compound of the formula $R^1$—H used in the process of the invention is preferably selected from the group of alcohols, polyetherols or phenols. A preferred starting compound used is a monohydric or polyhydric polyether alcohol or alcohol. Preference is given to using mono- to tetrahydric polyether alcohols or alcohols. Monohydric polyether alcohols or alcohols are employed with especial preference. It is advantageous to use low molecular mass polyetherols having molar masses of 50 to 2000 g/mol which have in turn been prepared beforehand by DMC-catalysed alkoxylation.

As well as compounds with aliphatic and cycloaliphatic OH groups, any compounds with OH functions are suitable. These include, for example, phenol, alkyl- and arylphenols.

As starting compounds with 2- to 4-fold OH functionality, of the formula $D^X$ with t=2 to 4, for example, preference is given to using compounds having molar masses of 62 to 10 000 g/mol, preferably 92 to 7000 g/mol, more preferably 122 to 5000 g/mol and especially preferably 2000 to 4000 g/mol. The starting compounds can be used in any desired mixtures with one another or as pure substance. It is also possible to use hydroxyl compounds substituted pendently with substituents containing alkoxysilyl groups, or substituted directly by alkoxysilyl groups, such as the silyl polyethers described in EP 2093244, as starting compounds. Used advantageously as starter compounds are low molecular mass polyetherols having molar masses of 62 to 4000 g/mol, which have in turn been prepared beforehand by DMC-catalysed alkoxylation.

As well as compounds with aliphatic and cycloaliphatic OH groups, any compounds with OH functions are suitable. These include, for example, phenol, alkyl- and arylphenols or else carbohydrates such as saccharides, for example, with particularly suitable starting compounds being bisphenol A and novolaks.

If the parameters j, k and l of the formula (I) are each=0, then the average molecular masses $M_w$ of the unit or units M with the formula (Ia) are preferably between 1000 to 50 000 g/mol, more preferably between 2000 and 20 000 g/mol, and also, with particular preference, from 4000 to 14 000 g/mol, and the products are preferably liquid at room temperature.

The average molar masses $M_w$ of the alkoxylation products of the unit or units D as per formula (I) are preferably between 4000 to 50 000 g/mol, more preferably between 8000 and 20 000 g/mol and with particular preference from 10 000 to 16 000 g/mol. The alkoxylation products of the formula (I) are preferably liquid at room temperature.

The hydrophilicity/hydrophobicity of the moieties M, D, T and Q in the alkoxylation products of the invention may be adjusted through the choice of suitable starter molecules and/or of suitable comonomers for the alkoxylation.

There are a variety of ways in which the alkoxylation products of the invention may be obtained. Preparation of the alkoxylation products of the invention takes place preferably in accordance with the process of the invention, which is described below.

A feature of the alkoxylation products of the formula (I) is that they can be prepared reproducibly and in a targeted way in terms of structural composition and molar mass. The sequence of the monomer units can be varied within wide limits. Epoxide monomers may as desired be incorporated randomly or in blockwise array with one another into the polymer chain. The fragments inserted into the resultant polymer chain by the ring-opening reaction of the reaction components are freely permutable with one another in their sequence, in the sense of being arrangeable in any desired order, with the restriction that cyclic anhydrides and also carbon dioxide are present with random insertion, in other words not in homologous blocks, in the polyether structure, and are also not directly adjacent to one another.

The indices reproduced in the formulae given here, and the value ranges of the indices specified, should therefore be understood as the averages of the possible statistical distribution of the structures and/or mixtures thereof that are actually present. This applies even to structural formulae which as such, per se, are reproduced exactly, such as for formula (Ia) and/or (II) for example.

Depending on the epoxide-functional alkoxysilane used and any further monomers used, and also, possibly carbon dioxide as well, it is possible for ester-modified or carbonate-modified silyl polyethers to be obtained. The alkoxysilyl unit in the compound of the formulae (Ia) and (II) is preferably a trialkoxysilyl unit, more particularly triethoxysilyl unit.

As $^{29}$Si-NMR and GPC investigations show, the process-related presence of chain-terminal OH groups provides the possibility for tranesterification reactions on the silicon atom, not only during the DMC-catalysed preparation but also, for example, in a downstream processing step. In such reactions, formally, the alkyl radical R bonded to the silicon via an oxygen atom is replaced by a long-chain modified alkoxysilyl polymer radical. Bimodal and multimodal GPC curves demonstrate that the alkoxylation products include not only the non-transesterified species, as shown in formula (I), but also those with twice, in some cases three times or even a multiple of the molar mass. Formula (I) therefore gives only a simplified reproduction of the complex chemical reality.

The alkoxylation products, therefore, represent mixtures which may also include compounds in which the sum of the indices f+g in formula (Ia) is on statistical average less than 3, since some of the OR groups may be replaced by silyl polyether groups. The compositions thus comprise species which are formed on the silicon atom with elimination of $R^3$—OH and condensation reaction with the reactive OH group of a further molecule of the formula (II). This reaction may take place a number of times until, for example, all of the $R^3O$ groups on the silicon have been replaced by further molecules of the formula (II). The presence of more than one signal in typical $^{29}$Si-NMR spectra of these compounds underlines the presence of silyl groups with different substitution patterns.

The reported values and preference ranges for the indices a, b, c, d, e, f, g, h, i, j, k, l, m, n, o, p, q, r, s, t, u, v, w, x and y in the compounds of the formulae (I), (Ia) and (II) should therefore be understood as averages across the different, individually intangible species. The diversity of chemical structures and molar masses is also reflected in the broad molar mass distribution of $M_w/M_n$, of usually ≥1.5, which are typical for alkoxylation products of the formula (I) and are completely unusual for conventional DMC-based polyethers.

Inseparably associated with the process set out in EP 2 093 244 for alkoxylating epoxy-functional alkoxysilanes is the particular feature that there is always one OH functionality present at the chain terminus or chain termini, originating from the epoxide ring opening of the last respective epoxide monomer, with attachment to the OH-functional end of the growing chain.

In EP 2415796 (US 2012/028022) and the unpublished patent application DE 10 2012 203737, the objective was to enable a reduction in the reactivity of the OH group of hydroxyl-terminated alkoxylation products of the formula (I) which do not carry exclusively terminal alkoxylsilyl groups. In these contexts it was possible to show that the reduction in the reactivity of the OH groups allows massive improvement in the shelflife and also in the elongation at break of the cured/polymerized, alkoxysilylated alkoxylation product. This was achievable through the introduction of an endcap on the hydroxyl group at the chain end of the prepolymer.

The products of the invention may be prepared in a wide variety of ways, in particular by means of processes which follow the lines of the process described in EP 2 093 244, EP 2415796 (US 2012/028022) or EP 2415797 (US 2012/029090). The alkoxylation products of the invention are preferably prepared by the process of the invention as described below.

The process of the invention for preparing an alkoxylation product of the invention with intrinsically reduced viscosity as per formula (I) is notable for the fact that at least one glycidyl ether of the general formula (IVb) and at least one glycidyl ether of the general formula (V), and optionally at least one alkylene oxide, are reacted. With preference at least one equivalent of the glycidyl ether of the general formula (IVb) is used, based on the total amount of alkoxylation product prepared.

The process of the invention for preparing an alkoxylation product of the invention with intrinsically reduced viscosity may consist preferably of up to two process steps. Carried out in process step A, preferably, is an alkoxylation reaction, which may be carried out in a number of stages, and which is optionally followed by a process step B, a so-called endcapping reaction.

Process Step A

In process step A, a DMC-catalysed alkoxylation of a starting compound is carried out with compounds containing epoxide groups (alkylene oxides and glycidyl ethers).

For starting the alkoxylation reaction by the process of the invention, the starting mixture, consisting of one or more OH-functional starting compounds $D^X$ and the double metal cyanide catalyst, which may optionally have been slurried in a suspension medium beforehand, is charged to the reactor.

The suspension medium utilized can be either a polyether or inert solvents or else, advantageously, one or more starting compounds $D^X$, or alternatively a mixture of both components.

The starting mixture charged to the reactor is admixed propylene oxide or at least one other epoxide compound. For starting the alkoxylation reaction and for activating the double metal cyanide catalyst, usually only a portion of the total amount of epoxide to be metered in is added to start with. The molar ratio of epoxide to the reactive groups of the starter, more particularly the OH groups in the starting mixture, is preferably, in the starting phase, between 0.1:1 to 10:1, more preferably between 0.2:1 to 5:1, more particularly between 0.4:1 to 3:1. It may be advantageous if before the epoxide is added, any reaction-inhibiting substances present are removed from the reaction mixture, by distillation, for example, optionally under reduced pressure.

The starting of the exothermic reaction may be detected, for example, by monitoring the pressure and/or temperature. In the case of gaseous alkylene oxides, a sudden drop in the pressure within the reactor is an indication that the alkylene oxide is being incorporated, and hence the reaction has started and the end of the starting phase has been reached. In the case of non-gaseous glycidyl ethers/esters or epoxide-functional alkoxysilanes, the onset of the reaction is indicated by the thermal change that sets in.

After the starting phase, in other words after initiation of the reaction, either, at the same time, further starting compound and further alkylene oxide, or only further alkylene oxide, are or is metered in, depending on the target molar mass. Alternatively, an arbitrary mixture of different alkylene oxide compounds and compounds of the formulae (IVa), (IVb) and (V) can also be used for the addition reaction, and these compounds can also be addition-reacted separately in any desired order, in succession.

For the purpose, for example, of reducing the viscosity of the reaction mixture, the reaction may be carried out in an inert solvent. Suitable inert solvents include hydrocarbons, especially toluene, xylene or cyclohexane. This, however, is less preferable.

In the products according to the invention, the molar ratio of the sum of the metered epoxides, including the epoxides already added in the starting phase, relative to the starting compound employed, more particularly relative to the number of OH groups in the starting compound employed, is preferably 1 to $10^5$:1, more particularly 1 to $10^4$:1.

Addition reaction of the alkylene oxide compounds takes place preferably at a temperature of 60 to 250° C., more preferably at a temperature of 90 to 160° C. The pressure under which the alkoxylation takes place is preferably 0.02 bar to 100 bar, more preferably 0.05 to 20 bar and in particular from 0.2 to 2 bar absolute. By implementation of the alkoxylation under subatmospheric pressure, the reaction can be carried out very securely. The alkoxylation may also, optionally, be carried out in the presence of an inert gas (e.g. nitrogen) or—for the preparation of polyethercarbonates—in the presence of carbon dioxide, under a subatmospheric pressure which is then preferably 1 to 20 bar absolute.

The lactones or cyclic anhydrides which may be used for preparing ester-modified polyethers may be added right in the starting phase to the starter/catalyst mixture, or else supplied at a later point in time in parallel with the alkylene oxide feed. The stated monomers may also be metered into the reactor in each case successively in alternation with alkylene oxides.

The molar ratio of the alkylene oxide monomers to cyclic anhydrides here is variable. It is usual to use at least equimolar amounts of alkylene oxide monomers, relative to anhydrides. With preference the alkylene oxides are used in a molar excess, in order to ensure complete anhydride conversion.

Lactones may be added during the alkoxylation alternatively in a stoichiometric excess or deficit, relative to the alkylene oxide monomers.

Following monomer addition and subsequent reaction, where appropriate, to complete the monomer conversion, any residues of unreacted monomer present and of any other volatile constituents are removed, typically by vacuum distillation, gas stripping or other deodorization methods. Volatile secondary components may be removed either discontinuously (batchwise) or continuously. In the process of the invention based on DMC catalysis there is normally no need for a filtration.

The process steps can be performed at identical or different temperatures. The mixture charged to the reactor at the start of reaction, composed of starting substance, DMC catalyst and optionally suspension medium, may be pretreated by stripping prior to commencement of monomer metering, in accordance with the teaching of WO 98/52689. In that case an inert gas is admixed to the reaction mixture via the reactor feed line, and more volatile components are removed from the reaction mixture by means of a vacuum unit connected to the reactor system, by application of an underpressure. In this simple way it is possible to rid the reaction mixture of substances which may inhibit the catalyst, such as lower alcohols or water, for example. The addition of inert gas and the simultaneous removal of the more volatile components may be of advantage particularly when running up/starting the reaction, since inhibiting compounds may also enter the reaction mixture as a result of the addition of the reactants or as a result of secondary reactions.

Double metal cyanide catalysts (DMC catalysts) employed in the process of the invention are preferably those described in EP 2 093 244, more particularly the DMC catalysts described therein as being preferred and particularly preferred.

In the reaction mixture, the catalyst concentration is preferably >0 to 1000 wppm (ppm by mass), more preferably >0 to 500 wppm, very preferably 0.1 to 300 wppm and especially preferably 1 to 200 wppm. This concentration is based on the overall mass of the alkoxylation products formed.

The catalyst is preferably metered into the reactor only once. The amount of catalyst should be made such as to provide sufficient catalytic activity for the process. The catalyst may be metered as a solid or in the form of a catalyst suspension. If a suspension is used, then the starter $D^X$ is a particularly suitable suspension medium. Preferably, however, suspension is not practiced.

It may be advantageous if step A of the process of the invention is carried out with alkoxylation in at least three stages. In stage 1, the starter compound $D^X$ is reacted with a small amount of propylene oxide in the presence of the DMC catalyst as described above. Then further propylene oxide is added on, to build up preferably a molar mass of not more than 500 to 5000 g/mol, more preferably not more than 1000 to 3000 g/mol, in addition to the starter used.

In stage 2, further propylene oxide and/or ethylene oxide are added, with addition of at least one glycidyl ether of the formula (IVb) and optionally one or more of the abovementioned glycidyl ethers of the formula (Iva); in stage 3, one or more of the compounds of the formula (V) are added, optionally with further addition of propylene oxide and/or ethylene oxide; stages 2 and 3 may also be combined into one stage.

In one particular embodiment of the process claimed, however, it is also possible for the above-described stages 2 and 3 to be combined and at the same time for at least one glycidyl ether of the formula (IVb) and optionally one or more of the abovementioned glycidyl ethers of the formula (IVa) to be metered in together with one or more of the compounds of the formula (V), optionally with further addition of propylene oxide and/or ethylene oxide.

As a result of the addition reaction of a mixture of compound of the formula (V) and propylene oxide in stage 3, the alkoxysilane functionality is introduced statistically over the polymer chain/polymer block. The sequence in which stages 2 and 3 are carried out is arbitrary. Preferably, after stage 1, stage 2 is carried out first, before stage 3 is performed. Stages 2 and 3 may be carried out multiply in succession. In the case of the multiple implementation of stages 2 and 3, the alkylene oxides used, and also the components of the formulae (IVa), (IVb) and (V) may be identical or different. The detailed process description given above serves only for improved illustration and represents one preferred addition sequence of the reaction participants. It must not be used as a basis for concluding that there is strictly blockwise construction of the alkoxylation products of the invention with reduced viscosity.

Stage 1 is carried out preferably at a temperature of 70-160° C., more preferably at 80-150° C., very preferably at a temperature of 100-145° C., especially preferably at 110-130° C. Stage 2 is carried out preferably at a temperature of 70-160° C., more preferably at 80-150° C., very preferably at a temperature of 100-145° C., especially preferably at 110-130° C. Stage 3 is carried out preferably at a temperature of 70-140° C., more preferably at 75-120° C., very preferably at a temperature of 80-110° C. If stages 2 and 3 are combined, the reaction temperature should be adapted to the temperature preferred under stage 3.

Process Step B

It may be advantageous if subsequently a process step B is carried out, in which the terminal OH group or groups of the alkoxylation product is or are reacted in such a way that there is no longer a free OH group present.

In one preferred embodiment of process step B, the reaction may be carried out with silanol formers or monoisocyanates, preferably with a monoisocyanate, as described in patent application EP 2415797 (US 2012/029090).

Suitable monoisocyanates which may be used are, at their most simple, alkyl, aryl and arylalkyl isocyanates. With preference it is possible to use methyl, ethyl, butyl, hexyl, octyl, dodecyl and stearyl isocyanate; butyl isocyanate is especially preferred.

Particularly suitable monofunctional isocyanates are also those which in turn carry crosslinkable alkoxysilyl groups in the molecule. These include, preferably, isocyanatoalkyl-trialkoxysilanes and isocyanatoalkyl-alkyldialkoxysilanes.

Suitable alkoxysilane-functional monoisocyanates which can be used include isocyanatotrimethoxysilane, isocyanatomethyltriethoxysilane, (isocyanatomethyl)methyl-dimethoxysilane, (isocyanatomethyl)methyldiethoxysilane, 3-isocyanatopropyl-trimethoxysilane, 3-isocyanatopropylmethyldimethoxysilane, 3-isocyanatopropyltriethoxy-silane and 3-isocyanatopropylmethyldiethoxysilane. Preferred here is the use of 3-iso-cyanatopropyltrimethoxysilane and -triethoxysilane.

In a further particularly preferred embodiment of process step B for preparing the alkoxylation products of the invention with intrinsically reduced viscosity of the formula (I), this step is notable in that in a first reaction step (a), polyethers of the formula PE are reacted with diisocyanates and, in a second reaction step (b), the product/product mixture from the first reaction step (a) is reacted with a molecule of the formula H-M. The polyethers of the formula PE are described above. The molecules of the formula H-M are compounds containing hydrogen bonded to the fragment M, which is described above.

In the process of the invention, the diisocyanates are preferably used in a molar excess relative to the polyethers PE.

In a further particularly preferred embodiment of process step B for preparing the alkoxylation products of the invention with intrinsically reduced viscosity of the formula (I), it is possible, if the indices j, k and l in the formula (I) are zero, for the fragments M to be reacted exclusively with polyisocyanates in the further reaction step, in which case the aim is for quantitative conversion not only of the terminal OH functions of the polyether but also of the isocyanate groups of the polyisocyanates. According to this reaction principle, therefore, it is possible, via a corresponding polyisocyanate, to construct dimers, trimers or tetramers of the alkoxysilyl polyether fragments M, according to the number of isocyanate groups in the polyisocyanate.

Furthermore, in the particularly preferred embodiment of reaction step (b) of process step B of the process of the invention, the polyethers PE are selected such that in the product there are more alkoxysilyl groups than groups UR.

The two reactions (a) and (b) are preferably carried out separately from one another in terms of time. In this case, preferably, the polyethers PE are reacted with the diisocyanates first of all. In this step, the stoichiometric proportions determine the number of UR fragments in the product. In the second reaction step (b), the isocyanate groups not consumed by reaction are reacted with the molecule H-M.

The reaction with the molecule H-M corresponds to an endcapping process. The aim with this reaction step is to consume preferably all of the isocyanate groups by reaction.

Process step B of the process of the invention for preparing alkoxysilyl compounds as per formula (I) is carried out preferably with isophorone diisocyanate in the presence of a transition metal catalyst, and is described in detail in the as yet unpublished patent application DE 10 2012 203737. Suitable in principle, however, are all known isocyanates, as compounds containing isocyanate groups. Preference in the sense of the teaching according to the invention is given, for example, to aromatic, aliphatic and cycloaliphatic polyisocyanates having a number-average molar mass of below 800 g/mol. Suitability is possessed accordingly by, for example, diisocyanates from the series 2,4-/2,6-toluene diisocyanate (TDI), methylendiphenyl diisocyanate (MDI), triisocyanatononane (TIN), naphthyl diisocyanate (NDI), 4,4'-diisocyanatodicyclohexylmethane, 3-isocyanatomethyl-3,3,5-trimethylcyclohexyl isocyanate (isophorone diisocyanate=IPDI), tetramethylene diisocyanate, hexamethylene diisocyanate (HDI), 2-methylpentamethylene diisocyanate, 2,2,4-trimethylhexamethylene diisocyanate (THDI), dodecamethylene diisocyanate, 1,4-diiso-cyanatocyclohexane, 4,4'-diisocyanato-3,3'-dimethyldicyclohexylmethane, 2,2-bis(4,4'-diisocyanatodicyclohexyl)propane, 3-isocyanatomethyl-1-methyl-1-isocyanatocyclohexane (MCI), 1,3-diisooctylcyanato-4-methylcyclohexane, 1,3-diisocyanato-2-methylcyclohexane and α,α,α',α'-tetramethyl-m- or -p-xylylene diisocyanate (TMXDI), and also mixtures consisting of these compounds.

Preferred diisocyanates for the preparation of the alkoxylation products of formula (I) used may be hexamethylene diisocyanate (HDI), isophorone diisocyanate (IPDI) and/or 4,4'-diisocyanatodicyclohexylmethane; in particular, isophorone diisocyanate (IPDI) may be used with preference. Likewise suitable as isocyanate-containing starting components are reaction products of the aforementioned isocyanates with themselves or with one another to form uretdiones or isocyanurates. Mention may be made, by way of example, of Desmodur® N3300, Desmodur® N3400 or Desmodur® N3600 (all BayerMaterialScience, Leverkusen, Del.). Additionally suitable as well are derivatives of isocyanates such as allophanates or biurets. Mention may be made, by way of example, of Desmodur® N100, Desmodur® N75MPA/BA or Desmodur® VPLS2102 (all BayerMaterialScience, Leverkusen, Del.).

The specifications EP 2415797 (US 2012/029090), and their disclosure content in relation to the processes disclosed therein, are considered hereby in full to be part of the present patent application.

It may be advantageous if process step B is carried out such that >20% by weight, preferably >50% by weight and more preferably >75% by weight of the alkoxylation products obtained no longer have a free OH group.

The alkoxylation products of the invention may be used, for example, for producing curable compositions.

A feature of curable compositions of the invention is that they comprise one or more of the above-described alkoxylation products of the invention, of the formula (I), and at least one curing catalyst.

It may be advantageous if the composition of the invention comprises only alkoxylation products of the formula (I) with i=2, j=1 to 4, k=0, l=0, u=(j+1) and v=0 to 4, as defined above, and no alkoxylation products of the formula (I) in which i=0, j=1, k=0, l=0, u=0 and v=0.

It may also be advantageous, however, if the composition of the invention, as well as alkoxylation products of the formula (I) with i=1 to 2, j=1 to 4, k=0, l=0, u=(j+1) and v=0 to 4, as defined above, also comprises alkoxylation products of the formula (I) in which l=0, j=1, k=0, l=0, u=0 and v=0. Where both kinds of alkoxylation products are present in the composition of the invention, the mass ratio (ratio of the parts by mass) of alkoxylation products of the formula (I) with i=1 to 2, j=1 to 4, k=0, l=0, u=(j+1) and v=0 to 4 to alkoxylation products of the formula (I) in which i=0, j=1, k=0, l=0, u=0 and v=0 is from 100: >0 to 10:90, preferably between 95:5 and 15:85 and more preferably between 80:20 and 30:70. With preference, the alkoxylation products of the formula (I) in which i=0, j=1, k=0, l=0, u=0 and v=0 also have, by way of alkoxysilyl groups, predominantly or exclusively, preferably exclusively, ethoxysilyl groups, preferably triethoxysilyl groups.

It may also be advantageous, however, if the composition of the invention, as well as alkoxylation products of the formula (I) with i=1 to 4, j=0, k=0, l=0, u=1 and v=0 to 2, as defined above, also comprises alkoxylation products of the formula (I) in which i=1, j=0, k=0, l=0, u=0 and v=0. Where both kinds of alkoxylation products are present in the composition of the invention, the mass ratio (ratio of the parts by mass) of alkoxylation products of the formula (I) with i=1 to 2, j=0, k=0, l=0, u=1 and v=0 to 4 to alkoxylation products of the formula (I) in which i=1, j=0, k=0, l=0, u=0 and v=0 is from 100: >0 to 10:90, preferably between 95:5 and 15:85 and more preferably between 80:20 and 30:70. With preference, the alkoxylation products of the formula (I) in which i=0, j=1, k=0, l=0, u=0 and v=0 also have, by way of alkoxysilyl groups, predominantly or exclusively, preferably exclusively, ethoxysilyl groups, preferably triethoxysilyl groups.

The fraction of the alkoxylation products of the invention in the composition of the invention is preferably 10% to less than 90% by weight, more preferably from 15% to 70% by weight, and very preferably from 20% to 65% by weight.

As curing catalysts (for the crosslinking or polymerization of the composition of the invention or the chemical fixing thereof to particle surfaces or macroscopic surfaces) it is possible to use the catalysts typically used for the hydrolysis and condensation of alkoxysilanes. As curing catalysts it is preferred to use organotin compounds, such as dibutyltin dilaurate, dibutyltin diacetylacetonate, dibutyltin diacetate, dibutyltin dioctoate, or dioctyltin dilaurate, dioctyltin diacetylacetonate, dioctyltin diketanoate, dioctylstannoxane, dioctyltin dicarboxylate and dioctyltin oxide, for example, preferably dioctyltin diacetylacetonate, dioctyltin dilaurate, dioctyltin diketanoate, dioctyistannoxane, dioctyltin dicarboxylate and dioctyltin oxide, more preferably dioctyltin diacetylacetonate and dioctyltin dilaurate. It is also possible, furthermore, to use zinc salts, such as zinc octoate, zinc acetylacetonate and zinc 2-ethylcaproate, or tetraalkylammonium compounds, such as N,N,N-trimethyl-N-2-hydroxypropylammonium hydroxide, N,N,N-trimethyl-N-2-hydroxypropylammonium 2-ethylhexanoate or choline 2-ethylhexanoate. Preference is given to the use of zinc octoate (zinc 2-ethylhexanoate) and the tetraalkylammonium compounds, more preferably the use of zinc octoate. It is also possible, furthermore, to use bismuth catalysts, e.g. Borchi® catalysts, titanates, e.g. titanium(IV) isopropoxide, iron(III) compounds, e.g. iron(III) acetylacetonate, aluminium compounds, such as aluminium triisopropoxide, aluminium tri-sec-butoxide and other alkoxides, and also aluminium acetylacetonate, calcium compounds, such as calcium disodium ethylenediaminetetraacetate or calcium diacetylacetonate, or else amines, e.g. triethylamine, tributylamine, 1,4-diazabicyclo[2.2.2]octane, 1,8-diaza-bicyclo [5.4.0]undec-7-ene, 1,5-di-azabicyclo[4.3.0]non-5-ene, N,N-bis(N,N-dimethyl-2-aminoethyl)methylamine, N,N-dimethylcyclohexylamine, N,N-dimethylphenylamine, N-ethylmorpholine, etc. Organic or inorganic Brønsted acids as well, such as acetic acid, trifluoroacetic acid, methanesulphonic acid, p-toluenesulphonic acid or benzoyl chloride, hydrochloric acid, phosphoric acid, the monoesters and/or diesters thereof, such as, for example, butyl phosphate, (iso)propyl phosphate, dibutyl phosphate, etc., are suitable as catalysts. It is of course also possible to use combinations of two or more catalysts.

The fraction of the curing catalysts as a proportion of the composition of the invention is preferably from 0.1% to 5% by weight, more preferably from 0.15% to 2% by weight and very preferably from 0.2% to 0.75% by weight, based on the overall composition.

The composition of the invention may comprise further adjuvants selected from the group consisting of plasticizers, fillers, solvents, adhesion promoters, additives for adapting the rheology, known as rheology additives, and drying agents, more particularly chemical moisture drying agents.

The composition of the invention preferably comprises one or more adhesion promoters and/or one or more drying agents, more particularly chemical moisture drying agents.

As adhesion promoters it is possible for the adhesion promoters known from the prior art, more particularly aminosilanes, to be present in the composition of the invention. As adhesion promoters it is possible to use with preference compounds which carry alkoxysilyl groups and which additionally possess primary or secondary amine groups, vinyl groups, thiol groups, aryl groups or alternatively oxirane groups, such as 3-aminopropyltrimethoxysilane (Dynasylan® AMMO (Evonik)), N-(2-aminoethyl)-3-aminopropyltrimethoxysilane (Dynasylan® DAMO (Evonik)), N-(n-butyl)aminopropyl-trimethoxysilane (Dynasylan® 1189, (Evonik)), 3-mercaptopropyltrimethoxysilane (Dynasylan® MTMO, Evonik), 3-glycidyloxypropyltriethoxysilane (Dynasylan® GLYEO, (Evonik)), 3-glycidyloxypropyltrimethoxysilane (Dynasylan® GLYMO, Evonik), phenyltrimethoxysilane (Dynasylan® 9165 or Dynasylan® 9265, Evonik) or oligomeric amino/alkylalkoxysilanes such as, for example, Dynasylan® 1146 (Evonik), in each case alone or in a mixture. Preferred adhesion promoters present are, for example, 3-aminopropyltriethoxysilane (Geniosil® GF 93 (Wacker), Dynasylan® AMEO (Evonik)) and/or (3-aminopropyl)methyldiethoxysilane (Dynasylan® 1505 (Evonik)), 3-aminopropyltrimethoxysilane (Dynasylan® AMMO (Evonik)), N-(2-aminoethyl)-3-aminopropyltrimethoxysilane (Dynasylan® DAMO (Evonik)), Dynasylan® 1146 (Evonik), with particular preference 3-aminopropyltriethoxysilane, 3-aminopropyltrimethoxysilane, N-(2-aminoethyl)-3-aminopropyltrimethoxysilane, Dynasylan® 1146, and, with more particular preference, 3-aminopropyltrimethoxysilane, 3-aminopropyltriethoxysilane, N-(2-aminoethyl)-3-aminopropyltrimethoxysilane and Dynasylan® 1146.

The fraction of the adhesion promoters as a proportion of the composition of the invention is preferably from greater than 0 to 5% by weight, more preferably from 0.5 to 4% by weight and very preferably from 1 to 2.5% by weight, based on the overall composition.

It can be advantageous if the composition of the invention comprises a drying agent, for the purpose, for example, of binding moisture or water introduced by formulation components or incorporated subsequently by the dispensing operation or storage. Drying agents which can be used in the compositions of the invention are in principle all of the drying agents that are known from the prior art. As chemical drying agents it is possible, for example, to use vinyltrimethoxysilane (Dynasylan® VTMO, Evonik or Geniosil® XL 10, Wacker AG), vinyltriethoxysilane (Dynasylan® VTEO, Evonik or Geniosil® GF 56, Wacker), vinyltriacetoxysilane (Geniosil® GF 62, Wacker), N-trimethoxysilylmethyl O-methyl carbamate (Geniosil® XL 63, Wacker), N-dimethoxy(methyl)silylmethyl O-methyl carbamate, N-methyl[3-(trimethoxysilyl)propyl]carbamate (Geniosil® GF 60, Wacker), vinyldimethoxymethylsilane (Geniosil® XL 12, Wacker), vinyltris(2-methoxyethoxy)silane (Geniosil® GF 58, Wacker), bis(3-triethoxysilylpropyl)amine (Dynasylan® 1122, Evonik), bis(3-trimethoxysilylpropyl)amine (Dynasylan® 1124), N-dimethoxy(methyl)silylmethyl O-methyl carbamate (Geniosil® XL 65, Wacker) or oligomeric vinylsilanes such as, for example, Dynasylan® 6490 and Dynasylan® 6498 (both obtainable from Evonik), alone or in a mixture. It is preferred to use vinyltrimethoxysilane (Dynasylan® VTMO, Evonik or Geniosil® XL 10, Wacker AG), vinyltriethoxysilane (Dynasylan® VTEO, Evonik, or Geniosil® GF 56, Wacker) as drying agents. As chemical moisture drying agent the composition of the invention preferably comprises vinyltrimethoxysilane (Dynasylan® VTMO, Evonik, or Geniosil® XL 10, Wacker AG). Furthermore, in addition to or alternatively to the chemical drying, it is possible to use a physical drying agent, such as, for example, zeolites, molecular sieves, anhydrous sodium sulphate or anhydrous magnesium sulphate.

The fraction of the drying agents as a proportion of the composition of the invention is preferably from greater than 0% to 5% by weight, more preferably from 0.2% to 3% by weight, based on the overall composition.

The composition of the invention may comprise one or more adjuvants selected from the group consisting of plasticizers, fillers, solvents and additives for adapting the rheology (rheological additives).

The plasticizers may be selected, for example, from the group of the phthalates, polyesters, alkylsulphonic esters of phenol, cyclohexanedicarboxylic esters or else polyethers. Plasticizers used are only those compounds which are different from the alkoxylation products of the invention of the formula (I).

When plasticizers are present in the composition of the invention, the fraction of the plasticizers as a proportion of the composition of the invention is preferably from greater than 0% to 90% by weight, more preferably 2% to 70% by weight, very preferably 5% to 50% by weight, based on the overall composition.

As fillers it is possible, for example, to use precipitated or ground chalk, inorganic carbonates in general, precipitated or ground silicates, precipitated or fumed silicas, glass powders, hollow glass beads (known as bubbles), metal oxides, such as $TiO_2$, $Al_2O_3$, for example, natural or precipitated barium sulphates, reinforcing fibres, such as glass fibres or carbon fibres, long-fibre or short-fibre wollastonites, cork, carbon black or graphite. Advantageously it is possible to use hydrophobized fillers, since these products introduce less water and improve the shelflife of the formulations.

If fillers are present in the composition of the invention, the fraction of the fillers in the composition of the invention is preferably from 1% to 70% by weight, based on the overall composition, with particularly preferred concentrations being from 30% to 65% by weight for the fillers specified here, with the exception of the fumed silicas. If fumed silicas are used, a fraction of the fumed sillicas of 2% to 20% by weight is particularly preferred.

As rheological additives, preferably present in addition to the filler, it is possible to select from the group of the amide waxes, obtainable for example from Cray Valley under the brand name Crayvallac®, hydrogenated vegetable oils and fats, fumed silicas, such as Aerosil® R202 or R805 (both obtainable from Evonik) or Cab-O-Sil® TS 720 or TS 620 or TS 630 (sold by Cabot), for example. If fumed silicas are already being used as a filler, it is possible not to add a rheological additive.

If rheological additives are present in the composition of the invention, the fraction of the rheological additives in the composition of the invention, depending on the desired rheology, is preferably from greater than 0% to 10% by weight, more preferably from 2% to 6% by weight, based on the overall composition.

The compositions of the invention may comprise solvents. These solvents may serve, for example, to lower the viscosity of the non-crosslinked mixtures, or may promote attachment to the surface. Solvents contemplated include in principle all solvents and also solvent mixtures. Preferred examples of such solvents are ethers such as tert-butyl methyl ether, for example, esters, such as ethyl acetate or butyl acetate or diethyl carbonate, for example, and also alcohols, such as methanol, ethanol and also the various regioisomers of propanol and butanol, for example, or else glycol types, which are selected according to the specific application. Additionally it is possible for aromatic and/or aliphatic solvents to be employed, and also halogenated solvents, such as dichloromethane, chloroform, tetrachloromethane, hydrofluorocarbons (FREON), etc., for example, and also inorganic solvents such as water, $CS_2$, supercritical $CO_2$ etc., for example.

As and when necessary, the compositions of the invention may further comprise one or more substances selected from the group encompassing co-crosslinkers, flame retardants, deaerating agents, antimicrobial compounds and preservatives, dyes, colorants and pigments, antifreeze agents, fungicides and/or reactive diluents and also complexing agents, spraying assistants, wetting agents, fragrances, light stabilizers, radical scavengers, UV absorbers and stabilizers, more particularly stabilizers against thermal and/or chemical exposures and/or exposures from ultraviolet and visible light.

As UV stabilizers it is possible, for example, to use known products based on hindered phenolic systems. As light stabilizers it is possible, for example, to use those known as HALS amines. Examples of stabilizers which can be used are the products or product combinations known to the skilled person and composed, for example, of Tinuvin® stabilizers (Ciba), such as, for example, Tinuvin® 1130, Tinuvin® 292 or else Tinuvin® 400, preferably Tinuvin® 1130 in combination with Tinuvin® 292. The amount in which they are used is guided by the degree of stabilization required.

Additionally it is possible to admix the curable compositions with co-crosslinkers for increasing mechanical hardness and reducing propensity to flow. Co-crosslinkers of this kind are typically substances capable of providing 3, 4 or more crosslinkable groups. Examples in the context of this invention are 3-aminopropyltriethoxysilane, tetramethoxysilane or tetraethoxysilane.

Preferred compositions of the invention comprise at least one alkoxylation product of the formula (I) and a plasticizer, a filler, an adhesion promoter, a drying agent or a (curing) catalyst.

Particularly preferred compositions of the invention contain from 10% to 90% by weight or less than 80% by weight, based on the overall composition, of alkoxylation product of the formula (I), having preferably on average between 2.0 and 8.0 ethoxysilyl functions per alkoxylation product of the formula (I), from 0.3% to 5.0% by weight, preferably from 0.5% to 4.0% by weight and more preferably from 1.0 by weight to 2.5% by weight, based on the overall composition of adhesion promoter, less than 30% by weight, based on the overall composition, of plasticizer, the mass ratio of alkoxylation product of the formula (I) and plasticizer being more preferably less than 1.1 times that of the alkoxylation product of the formula (I), from 1% to 70% by weight, based on the overall composition, of fillers, from 0.2% to 3.0% by weight, based on the overall composition, of chemical moisture drying agents, and from 0.1% to 5.00% by weight, preferably from 0.2% to 3.00% by weight and more particularly 0.1% to 0.5% by weight, based on the overall composition, of curing catalysts. In especially preferred compositions, the stated fractions of the formulating ingredients are selected such that the overall sum of the fractions adds up to 100% by weight.

The compositions of the invention may for example be a sealant or adhesive or may be used for producing a sealant or adhesive.

The composition of the invention, more particularly the composition of the invention thus obtained, cures within time periods comparable to hitherto commercially available and technically employed products, and crosslinks, following application in relatively thick layers, throughout its depth very effectively as well. The flank adhesion and attachment to different substrates, such as steel, aluminium, various plastics and mineral substrates such as stone, concrete and mortar, for example, are particularly good.

The compositions of the invention may be used more particularly for reinforcing, levelling, modifying, adhesively bonding, sealing and/or coating substrates. Examples of suitable substrates are particulate or sheetlike substrates, in the construction industry or in vehicle construction, construction elements, components, metals, especially construction materials such as iron, steel, stainless steel and cast iron, ceramic materials, especially based on solid metal oxides or non-metal oxides or carbides, aluminium oxide, magnesium oxide or calcium oxide, mineral substrates or organic substrates, more particularly cork and/or wood, substrate minerals, chipboard and fibreboard panels of wood or cork, composite materials such as, for example, wood composites such as MDF boards (medium-density fibreboards), WPC articles (wood plastic composites), chipboard panels, cork articles, laminated articles, ceramics, but also natural fibres and synthetic fibres (or substrates comprising them) or mixtures of different substrates. The compositions of the invention are used with particular preference for the sealing and/or coating of particulate or sheetlike substrates, in the construction industry or in vehicle construction, for sealing and bonding construction elements and components, and also for coating porous or non-porous, particulate or sheetlike substrates, for coating and modifying surfaces, and for applications on metals, especially on construction materials such as iron, steel, stainless steel and cast iron, for application on ceramic materials, especially those based on solid metal oxides or non-metal oxides or carbides, aluminium oxide, magnesium oxide or calcium oxide, on mineral substrates or organic substrates, more particularly on cork and/or wood, for binding, reinforcing and levelling uneven, porous or friable substrates, such as, for example, substrate minerals, chipboard and fibreboard panels made of wood or cork, composite materials such as, for example, wood composites such as MDF boards (medium-density fibreboards), WPC articles (wood plastic composites), chipboard panels, cork articles, laminated articles, ceramics, but also natural fibres and synthetic fibres, or mixtures of different substrates.

As a result of this broad spectrum of adhesion, they are also suitable for bonding combinations of materials comprising the stated substrates. In this context it is not critical whether the surfaces are smooth or roughened or porous. Roughened or porous surfaces are preferred, on account of the greater area of contact with the adhesive.

The compositions of the invention are applied preferably in a temperature range of 10° C.-40° C. and cure well under these conditions as well. On account of the moisture-dependent curing mechanism, a relative humidity of not less than 35% to not more than 75% is particularly preferred for effective curing. The cured adhesive bond (composition) can be used in a temperature range from −10° C. to 80° C. The bonds produced with the compositions of the invention are stable to water at T<60° C. and to non-swelling solvents. The bond is not resistant to solvents which swell the formulation, such as methanol, ethanol, toluene, tetrahydrofuran, acetone and isopropanol, for example.

Swellability by ethanol which is formed during the crosslinking reaction of the alkylation products is a fundamental requirement, since the ethanol which is formed does not hinder the curing, even within large, extensive bonds. The ethanol is transported off towards the edges, where it evaporates. Consequently, rapid curing of the extensive bond is ensured with the formulations of the invention.

In the examples listed below, the present invention is described by way of example, without wishing to restrict the invention, the scope of application of which emerges from the entire description and the claims, to the embodiments stated in the examples.

EXAMPLES

General Remarks

The viscosity was determined as a function of shear rate at 25° C. using the MCR301 rheometer from Anton Paar in a plate/plate arrangement with a gap width of 1 mm. The diameter of the upper plate was 40 mm. The viscosity at a shear rate of 10 s$^{-1}$ was read off and is listed in Tables 1 and 2.

Example 1

Synthesis of a PPG-Based Alkoxylsilyl-Functional Polyether—Used for Non-Inventive Formulations (Comparative Example)

A 5-liter autoclave was charged with 353 g of PPG 2000, and 150 ppm (based on the total batch) of a zinc hexacyanocobaltate-double metal cyanide catalyst were added. To render the reactor inert, it was charged with nitrogen to 3 bar and then let down to atmospheric pressure. The procedure was repeated twice more. With stirring, the contents of the reactor were heated to 130° C. and evacuation took place to about 20 mbar, in order to remove volatile components. After 30 minutes, 80 g of propylene oxide were metered into the evacuated reactor in order to activate the catalyst. The internal pressure rose initially to about 0.8 bar. After about 6 minutes, the reaction set in, as evident from a drop in the reactor pressure. At this point, 1218 g of propylene oxide were metered in continuously over the course of about 50 minutes. This was followed by a one-hour afterreaction, during which the temperature was lowered to 95° C. At this temperature, a mixture of 196 g of Dynasylan® GLYEO (from Evonik) and 1233 g of propylene oxide was metered in continuously at a rate such that the temperature remained constant. After a further one-hour afterreaction, deodorization was carried out by application of a pressure (P<100 mbar) to remove residues of unreacted alkylene oxide. After that, 500 ppm of Irganox® 1135 (from BASF) were stirred in for 15 minutes. This gave a colourless, high-viscosity product: the respective molar ratios of the reactants used, based on one mol of starter, can be seen from Table 1.

Examples 2 and 3

Synthesis of PPG-Based Alkoxylsilyl-Functional Polyethers—Used for Non-Inventive Formulations (Comparative Example)

The synthesis was carried out in the same way as Example 1 with adapted initial quantities, to give the molar ratios listed in Table 1 of the reactants used, based on 1 mol of starter. The starter for Example 3 was melted at 80° C. prior to the experiment.

Examples 4-8

Synthesis of Alkoxysilyl-Functional Polyethers with Intrinsically Reduced Viscosity (Inventive)

The syntheses were carried out in the same way as for Examples 1-3, with the target product being constructed by addition of three blocks onto the respective starting molecule. After the addition of the first block, which was constructed from PO as alkylene oxide, and after a 30-minute afterreaction, a second block followed, in which as well as PO 2-ethylhexyl glycidyl ether (EHGE/raw material: IPDX RD 17) was metered in. The metered addition was followed by a one-hour afterreaction.

In the concluding third block, a mixture of Dynasylan® GLYEO and PO was added, followed by a one-hour afterreaction time. The two first blocks were added on at 130° C., the third block at 95° C. Concludingly, the reaction mixture was degassed at 95° C. for 15 minutes and 500 ppm of antioxidant (Irganox® 1135) were stirred in. The molar ratios of the reactants used, based on 1 mol of starter, can be seen from Table 1.

Example 9

Synthesis of Alkoxysilyl-Functional Polyethers with Intrinsically Reduced Viscosity (Inventive)

The syntheses were carried out in the same way as for Examples 4-8, with the target product being constructed by addition of two blocks onto the respective starting molecule. After the addition of the first block, which was constructed from PO as alkylene oxide, and after a 30-minute afterreaction, no second block followed; instead, directly, the third block according to Table 1 followed, by the metered addition not only of PO but also of 2-ethylhexyl glycidyl ether (EHGE/raw material: IPDX RD 17), and also of Dynasylan® GLYEO. Metered addition was followed by a one-hour afterreaction.

The first block was added on at 130° C., the second block at 95° C. Concludingly, the reaction mixture was degassed at 95° C. for 15 minutes and 500 ppm of antioxidant (Irganox® 1135) was stirred in. The molar ratios of the reactants used, based on 1 mol of starter, can be seen from Table 1.

TABLE 1

| Ex. No. | Starter | Block 1. $n_{PO}$ [mol.] | Block 2. $n_{PO}$ [mol.] | Block 2. $n_{EHGE}$** [mol.] | Block 3. $n_{GLYEO}$ [mol.] | Block 3. $n_{PO}$ [mol.] | Block 3. $n_{EHGE}$** [mol.] | Viscosity (25° C.) [Pa · s] |
|---|---|---|---|---|---|---|---|---|
| 1 | PPG 2000* | 119 | 0 | 0 | 4 | 120.5 | 0 | 11.0 |
| 4 | PPG 2000* | 18 | 97 | 4 | 4 | 120.5 | 0 | 6.2 |
| 5 | PPG 2000* | 18 | 93 | 8 | 4 | 120.5 | 0 | 3.3 |
| 2 | PPG 2000* | 87 | 0 | 0 | 4 | 103 | 0 | 12.1 |
| 6 | PPG 2000* | 18 | 65 | 4 | 4 | 103 | 0 | 6.0 |
| 7 | PPG 2000* | 34 | 61 | 8 | 4 | 103 | 0 | 3.5 |
| 3 | PolyTHF 2000⁺ | 51.7 | 0 | 0 | 3 | 71.8 | 0 | 22.9 |
| 8 | PolyTHF 2000⁺ | 13.2 | 34.5 | 4 | 3 | 71.8 | 0 | 6.0 |
| 9 | PolyTHF 2000⁺ | 51.7 | 0 | 0 | 3 | 67.8 | 4 | 6.4 |

*Polypropylene glycol polyether with an average molecular weight of 2000 g/mol
**2-Ethylhexyl glycidyl ether = EHGE = IPOX RD 17 (Ipox Chemicals)
⁺Poly THF ® 2000 (available from BASF) is polytetrahydrofuran with an average molecular weight of 2000 g/mol.

Endcapping (Process According to DE 102012203737):

The alkoxylation products prepared in Examples 1-9 were subsequently reacted using IPDI, by process A or B.

Examples According to Process A

Example 10

185.4 g of silyl polyether from Example 1 were introduced as an initial charge and heated to 60° C. Then 5.8 g of IPDI were added, the mixture was stirred for five minutes, and 0.2 g of TIB Kat 722 was added. The mixture was stirred for 45 minutes and heated to 80° C., and 11.6 g of a polyether of the general formula $C_4H_9O[CH_2CH(CH_3)O]_{5.6}H$ were added. This was followed by stirring for a further 3 hours.

Example 11

509.4 g of silyl polyether from Example 4 were introduced as an initial charge and heated to 60° C. Then 15.51 g of IPDI were added, the mixture was stirred for five minutes, and 0.6 g of TIB Kat 722 was added. The mixture was stirred for 45 minutes and heated to 80° C., and 31.1 g of a polyether of the general formula $C_4H_9O[CH_2CH(CH_3)O]_{5.6}H$ were added. This was followed by stirring for a further 3 hours.

Example 12

505.1 g of silyl polyether from Example 5 were introduced as an initial charge and heated to 60° C. Then 14.95 g of IPDI were added, the mixture was stirred for five minutes, and 0.6 g of TIB Kat 722 was added. The mixture was stirred for 45 minutes and heated to 80° C., and 30.0 g of a polyether of the general formula $C_4H_9O[CH_2CH(CH_3)O]_{5.6}H$ were added. This was followed by stirring for a further 3 hours.

Example 13

706.8 g of silyl polyether from Example 2 were introduced as an initial charge and heated to 60° C. Then 26.8 g of IPDI were added, the mixture was stirred for five minutes, and 0.8 g of TIB Kat 722 was added. The mixture was stirred for 45 minutes and heated to 80° C., and 53.5 g of a polyether of the general formula $C_4H_9O[CH_2CH(CH_3)O]_{5.6}H$ were added. This was followed by stirring for a further 3 hours.

Example 14

703.7 g of silyl polyether from Example 6 were introduced as an initial charge and heated to 60° C. Then 25.64 g of IPDI were added, the mixture was stirred for five minutes, and 0.8 g of TIB Kat 722 was added. The mixture was stirred for 45 minutes and heated to 80° C., and 51.4 g of a polyether of the general formula $C_4H_9O[CH_2CH(CH_3)O]_{5.6}H$ were added. This was followed by stirring for a further 3 hours.

Example 15

725.3 g of silyl polyether from Example 7 were introduced as an initial charge and heated to 60° C. Then 25.5 g of IPDI were added, the mixture was stirred for five minutes, and 0.8 g of TIB Kat 722 was added. The mixture was stirred for 45 minutes and heated to 80° C., and 51.0 g of a polyether of the general formula $C_4H_9O[CH_2CH(CH_3)O]_{5.6}H$ were added. This was followed by stirring for a further 3 hours.

Examples According to Process B

Example 16

703.1 g of silyl polyether from Example 2 were introduced as an initial charge and heated to 70° C. Then 26.5 g of IPDI were added, the mixture was stirred for five minutes, and 0.05 g of TIB Kat 216 (dioctyltin dilaurate) was added. The mixture was stirred for 30 minutes, and 53.2 g of a polyether of the general formula $C_4H_9O[CH_2CH(CH_3)O]_{5.6}H$ were added. This was followed by stirring for a further 5 hours.

Example 17

701.2 g of silyl polyether from Example 6 were introduced as an initial charge and heated to 70° C. Then 25.5 g of IPDI were added, the mixture was stirred for five minutes, and 0.05 g of TIB Kat 216 (dioctyltin dilaurate) was added. The mixture was stirred for 30 minutes, and 51.2 g of a polyether of the general formula $C_4H_9O[CH_2CH(CH_3)O]_{5.6}H$ were added. This was followed by stirring for a further 5 hours.

Example 18

722.5 g of silyl polyether from Example 7 were introduced as an initial charge and heated to 70° C. Then 25.4 g of IPDI were added, the mixture was stirred for five minutes, and 0.05 g of TIB Kat 216 (dioctyltin dilaurate) was added. The mixture was stirred for 30 minutes, and 50.88 g of a polyether of the general formula $C_4H_9O[CH_2CH(CH_3)O]_{5.6}H$ were added. This was followed by stirring for a further 5 hours.

Example 19

2681.5 g of silyl polyether from Example 3 were introduced as an initial charge and heated to 70° C. Then 143.1 g of IPDI were added, the mixture was stirred for five minutes, and 0.19 g of TIB Kat 216 (dioctyltin dilaurate) was added. The mixture was stirred for 30 minutes, and 286.8 g of a polyether of the general formula $C_4H_9O[CH_2CH(CH_3)O]_{5.6}H$ were added. This was followed by stirring for a further 5 hours.

Example 20

1181.4 g of silyl polyether from Example 8 were introduced as an initial charge and heated to 70° C. Then 59.9 g of IPDI were added, the mixture was stirred for five minutes, and 0.08 g of TIB Kat 216 (dioctyltin dilaurate) was added. The mixture was stirred for 30 minutes, and 120.1 g of a polyether of the general formula $C_4H_9O[CH_2CH(CH_3)O]_{5.6}H$ were added. This was followed by stirring for a further 5 hours.

Example 21

1069.7 g of silyl polyether from Example 9 were introduced as an initial charge and heated to 70° C. Then 54.3 g of IPDI were added, the mixture was stirred for five minutes, and 0.07 g of TIB Kat 216 (dioctyltin dilaurate) was added. The mixture was stirred for 30 minutes, and 108.8 g of a polyether of the general formula $C_4H_9O[CH_2CH(CH_3)O]_{5.6}H$ were added. This was followed by stirring for a further 5 hours.

Examples 11, 12, 14, 15, 17, 18, 20 and 21 are inventive; Examples 10, 13, 16 and 19 serve as comparative examples.

TABLE 2

| Example | Reaction of alkoxylation product from example | Process | Viscosity (25° C.) [Pa · s] |
|---|---|---|---|
| 10 | 1 | A | 68.4 |
| 11 | 4 | A | 46.0 |
| 12 | 5 | A | 35.5 |
| 13 | 2 | A | 72.0 |
| 14 | 6 | A | 32.6 |
| 15 | 7 | A | 22.2 |
| 16 | 2 | B | 34.5 |
| 17 | 6 | B | 23.6 |
| 18 | 7 | B | 15.0 |
| 19 | 3 | B | 59.0 |
| 20 | 8 | B | 32.2 |
| 21 | 9 | B | 36.8 |

TABLE 3

Characteristic mechanical values for the cured formulation on the S2 dumbbell specimen and on a lapped bond of two V2A steel plates:

| Polymer according to example | S2 dumbbell specimen | | Bond |
| | Elongation at break [%] | Breaking stress [N/mm$^2$] | Breaking stress [N/mm$^2$] |
|---|---|---|---|
| 10 | 171 | 1.7 | 1.5 |
| 11 | 199 | 1.7 | 1.5 |
| 12 | 163 | 1.5 | 1.4 |
| 13 | 212 | 1.7 | 1.3 |
| 14 | 170 | 1.7 | 1.6 |
| 15 | 170 | 1.7 | 1.3 |
| 16 | 189 | 1.6 | 1.3 |
| 17 | 163 | 1.8 | 1.5 |
| 18 | 147 | 1.6 | 1.3 |
| 19 | 184 | 1.3 | 1.2 |
| 20 | 181 | 1.6 | 1.3 |
| 21 | 143 | 1.8 | 1.8 |

Preparation of the Room-Temperature-Applyable Adhesive/Sealant Formulations:

25.9% by weight of the alkoxylation product according to the respective examples was mixed very thoroughly with 18.1% by weight of diisoundecyl phthalate, 51.1% by weight of precipitated chalk (Socal® U1S2, Solvay), 0.5% by weight of titanium dioxide (Kronos® 2360, Kronos), 1.4% by weight of adhesion promoter (Dynasylan® AMMO, Evonik), 1.1% by weight of drying agent (Dynasylan® VTMO, Evonik), 1.5% by weight of an antioxidant/stabilizer mixture (Irganox® 1135:Tinuvin® 1130:Tinuvin® 292 ratio=1:2:2) and 0.4% by weight of the curing catalyst (TIB® KAT 223, TIB) in a mixer (Speedmixer® FVS 600, Hausschild). The completed formulation was transferred to PE cartridges and stored for a minimum of 24 hours at room temperature prior to application. Since the formulations of the alkoxylation products in the examples specified above were identical in all cases, the discussion of the results has been carried out on the basis of the identification of the alkoxylation product utilized as a basis for the formulation.

Determination of Breaking Force and Elongation at Break in Accordance with DIN 53504:

The formulation was applied by knifecoating in a layer thickness of 2 mm to a PE surface. The films were stored for 7 days at 23° C. and 50% relative humidity. Using a shape cutter and a toggle press, S2 dumbbell specimens were then punched from the films.

The dumbbell specimens produced in this way were clamped for testing into a universal testing machine (from Shimadzu), and a determination was made of the breaking force and elongation break on stretching of the specimens at constant speed (200 mm/min).

Determination of the Tensile Shear Strength of Lapped Bonds in Accordance with DIN EN 1465

The formulation prepared was used to produce lapped bonds. This was done using two stainless steel substrates (V2A, 1.4301). The region of the lapped bond was 500 mm$^2$. The bonds were cured at 23° C. and 50% relative humidity. After 21 days, the bonds were clamped into a universal testing machine (from Shimadzu) and, with a constant speed (10 mm/min), a force was exerted on the bond until the bond ruptured. The breaking force was ascertained.

From the viscosities shown in Tables 1 and 2 it is clearly apparent that the viscosity of the alkoxylation products of the invention is reduced significantly by the replacement of 4 or 8 mol of PO by the corresponding number of moles of IPDX RD 17.

According to Table 1, for alkoxylation products of terminal OH groups, a reduction in viscosity of at least 40% is posted for the replacement of 4 mol of PO by 4 mol of IPDX RD 17, and a reduction in viscosity of at least 60% for the replacement of 8 mol of PO by 8 mol of IPDX RD 17; the same trend can also be read off in Table 2, for alkoxylation products without terminal OH groups, with a reduction of viscosity of at least 25% being posted for replacement of 4 mol of PO by 4 mol of IPDX RD 17, and a reduction of viscosity of at least 40% being posted for replacement of 8 mol of PO by 8 mol of IPDX RD 17. Similarly convincing results were achieved for the replacement of 2 mol of PO by 2 mol of IPDX RD 17, with a reduction in viscosity of at least 10%, and for replacement of 1 mol of PO by 1 mol of IPDX RD 17, with a reduction in viscosity of at least 5%. Furthermore, comparable results were obtainable with branched structural elements other than radical $R^{12}$ in the formulae (Ia) and (II). The results show, furthermore, that the level of the decrease in viscosity can be controlled in large parts via the molar fraction of branched structural elements.

The characteristic mechanical values for the alkoxylation products of the invention with intrinsically reduced viscosity are summarized in Table 3 and show no significant deviations from the characteristic mechanical values of the alkoxylation products from the comparative examples, with increased viscosity.

It is therefore found, surprisingly, that the change in the chemical nature of the alkoxylation products of the invention has no marked influences on the key performance properties of the formulations based on the alkoxylation products of the invention, and that it is possible, nevertheless, to obtain products which are comparable in performance terms but have significantly reduced viscosity.

The invention claimed is:

1. An alkoxylation product with an intrinsically reduced viscosity, said alkoxylation product comprising a polymer of formula (I)

$$M_i D_j T_k Q_l UR_u AP_v \qquad \text{formula (I)}$$

where the fragments M, D, T and Q are linked not to one another, but instead with one another, via the groups UR and/or AP, and the groups UR and AP are linked, not to one another, but instead with one another, correspondingly, via the fragments M, D, T or Q, where
i=0 to 16,
j=0 to 10,
k=0 to 6,
l=0 to 4,
u=0 to 17,
v=0 to 6,
with the proviso that i+j+k+l>=1,
M independently at each occurrence is an oxygen-radical-carrying hydrocarbon radical having a minimum numerical molar mass of 88 g/mol,
or is a radical of formula (Ia), or of formula (Ib), or of formula (Ic)

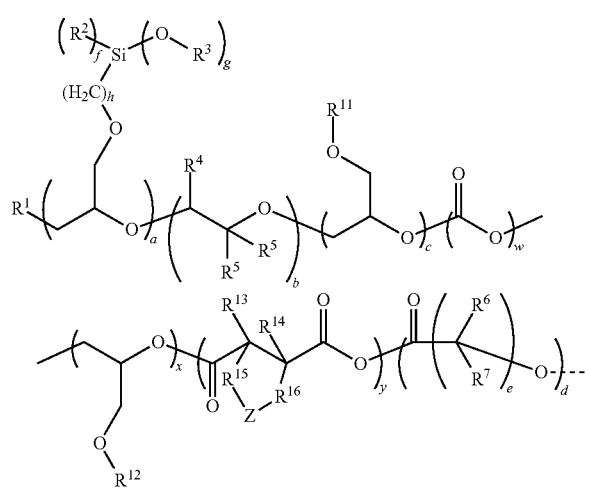

formula (Ia)

where
a=0 to 1000,
b=1 to 1000,
c=0 to 1000,
d=0 to 1000,
w=an integer from 0 to 1000,
x=0 to 1000,
y=an integer from 0 to 500,
e=1 to 10,
f=0 to 2,
g=1 to 3,
with the proviso that g+f=3 and g is at least 1,
h=0 to 10
and with the proviso that the various monomer units of the fragments with the indices a, b, c, d, w, x and y are freely permutable among one another, and each of the groups with the indices w and y cannot follow itself or the other respective group,
and where
$R^1$=independently at each occurrence a saturated or unsaturated, linear or branched organic hydrocarbon radical
$R^2$=independently at each occurrence an alkyl group having 1 to 8 carbon atoms,
$R^3$=independently at each occurrence an alkyl group having 1 to 8 carbon atoms,
$R^4$=independently at each occurrence a hydrogen radical, an alkyl group having 1 to 20 carbon atoms, an aryl or alkaryl group, or $R^4$ and one of the radicals $R^5$ taken together form a ring which comprises the atoms bonded to $R^4$ and $R^5$,
$R^5$=independently at each occurrence a hydrogen radical or an alkyl group having 1 to 8 carbon atoms,
$R^6$, $R^7$=independently at each occurrence a hydrogen radical, an alkyl group having 1 to 20 carbon atoms, an aryl, alkaryl group, and/or alkoxy group,
$R^{11}$=independently at each occurrence a saturated or unsaturated alkyl group having 1 to 24 carbon atoms, an aryl group having 6 to 20 carbon atoms, or an alkaryl group having 7 to 30,
$R^{12}$=independently at each occurrence a saturated or unsaturated, aliphatic or aromatic hydrocarbon radical having 2 to 30 C atoms, and/or an alkaryl group having 7 to 30, with the proviso that there must be at least one branched structural element present,
$R^{13}$, $R^{14}$=independently at each occurrence hydrogen and/or an organic radical, or $R^{13}$ and/or $R^{14}$ is absent, and, if $R^{13}$ and $R^{14}$ are absent, there is a C=C double bond instead of the radicals $R^{13}$ and $R^{14}$;
the bridging fragment Z is present or absent:
if the bridging fragment Z is absent, then
$R^{15}$, $R^{16}$=independently at each occurrence hydrogen and/or an organic radical, and, if one of the radicals $R^{13}$ or $R^{14}$ is absent, the respective germinal radical is an alkylidene radical,
if the bridging fragment Z is present, then
$R^{15}$ and $R^{16}$=hydrocarbon radicals which are bridged cycloaliphatically or aromatically via the fragment Z, Z representing a divalent alkylene or alkenylene radical,

formula (Ib)

where
$R^{17}$=independently at each occurrence a linear or branched, saturated or unsaturated, alkyl group having 1 to 30 carbon atoms, an aryl or alkaryl group,

formula (Ic)

where
$R^{18}$=a divalent linear or cyclic, saturated or unsaturated alkyl or aryl group,
and, if j, k and l are each=0, then M must=formula (Ia);
and where, for the fragments D, T and Q:
D is a polyether radical PE with t being 2,
T is a polyether radical PE with t being 3 and
Q is a polyether radical PE with t being 4,
where
PE independently at each occurrence is a polyether radical with the formula
-(D$^A$)$_t$-D$^X$,
where t=2 to 4, and
D$^X$ is a t-valent functional, saturated or unsaturated, linear or branched organic hydrocarbon radical, each of the radicals D$^A$ being bonded covalently to the radical D$^X$, and where $D^A$ is a fragment of the formula (II)

formula (II)

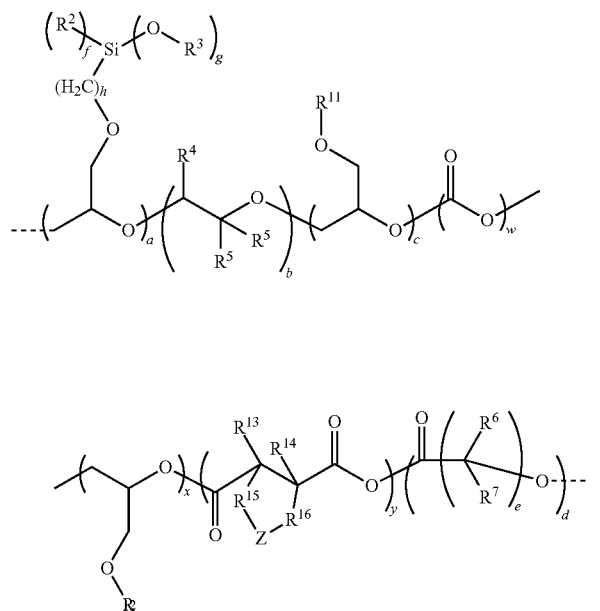

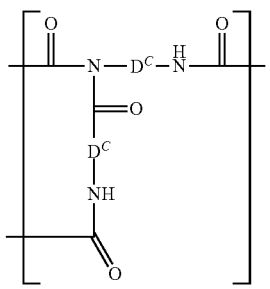 (IIIa)

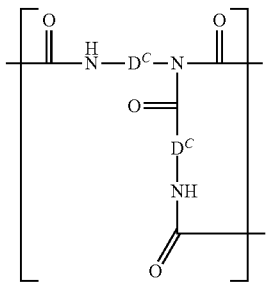 (IIIb)

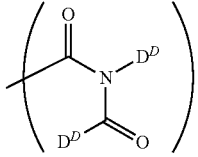 (IIIc)

with a to h, w, x and y and $R^2$ to $R^{16}$ independently of one another as defined in formula (Ia), with the proviso that the sum of all the indices a from formula (Ia) and formula (II) must be greater than or equal to 1, wherein the sum of all the indices x from formula (Ia) and formula (II) must be greater than or equal to 1, UR independently at each occurrence are identical or different divalent radicals of the form -U-$D^C$-U-, or a monovalent radical of the form $D^D$-U-, or a trivalent radical of the form $D^E U_3$, or a tetravalent radical of the form $D^F U_4$, where U is a —C(O)—NH— group which is bonded via the nitrogen to $D^C$, $D^E$, $D^F$ or $D^D$, and $D^C$ independently at each occurrence is a divalent substituted or unsubstituted, linear or branched, saturated or unsaturated hydrocarbon radical having 1 to 30 carbon atoms, selected from alkyl, alkenyl, aryl or alkaryl radicals, and $D^D$ independently at each occurrence is a monovalent linear or branched, saturated or unsaturated hydrocarbon radical having 1 to 30 carbon atoms, selected from alkyl, alkenyl, aryl or alkaryl radicals, and $D^E$ independently at each occurrence is a trivalent substituted or unsubstituted linear or branched, saturated or unsaturated hydrocarbon radical having 1 to 30 carbon atoms, selected from alkyl, alkenyl, aryl or alkaryl radicals, and $D^F$ independently at each occurrence is a tetravalent substituted or unsubstituted, linear or branched, saturated or unsaturated hydrocarbon radical having 1 to 30 carbon atoms, selected from alkyl, alkenyl, aryl or alkaryl radicals, and AP independently at each occurrence are identical or different radicals of the general formula (IIIa), (IIIb) or (IIIc)

or, if polyisocyanates with the structural units $D^E$ and/or $D^F$ are used, additionally structural elements analogous to formula (IIIa) and/or (IIIb), where the three urethane units bonded to $D^E$ and/or the four urethane units bonded to $D^F$, independently of one another, have all or in part been further reacted to give allophanate structural units, as shown in the top part of the formulae (IIIa) and (IIIb).

2. The alkoxylation product according to claim 1, wherein x of formulae (Ia) and (II) is in total greater than or equal to 2, and b is in total greater than or equal to 0, and $R^{12}$ is a branched alkyl chain having 4 to 20 carbon atoms.

3. The alkoxylation product according to claim 1, wherein in formula (I), k and l=0, j=0 to 2, i=2, u=j+1 and v=0, and x of formula (Ia) and (II) is in total greater than or equal to 2 and b is in total 2 to 300.

4. The alkoxylation product according to claim 1, where in formula (I)
i=2 to 10,
j=0 to 6,
k=0 to 2,
l=0 to 2,
u=(19)+(2*k)+(3*1)+1,
v=0,
where M corresponds to formula (Ia) with
a=0 to 6,
b=12 to 500,
c=0 to 4,
d=0,
w=0,
x=0 to 10,
y=0,
e=1 to 10,
f=0 to 2, g=1 to 3,
with the proviso that g+f=3
h=1,2 or 3, and
where for formula (II):
a=1 to 10,
b=10 to 700,
c=0 to 2,
d=0,
w=0,
x=1 to 10,
y=0,
e=1 to 10,
f=0 to 2,
g=1 to 3,
with the proviso that g+f=3,
h=1, 2 or 3,
and where for formula (Ia) and formula (II):
$R^2$=independently at each occurrence a methyl or ethyl, propyl or isopropyl group,
$R^3$=independently at each occurrence a methyl or ethyl, propyl or isopropyl group,
$R^4$=independently at each occurrence hydrogen, methyl or ethyl,
$R^5$=hydrogen or a methyl or ethyl group,
$R^{11}$=independently at each occurrence methyl, ethyl, butyl, hexyl, octyl, $C_{12}/C_{14}$ alkyl, phenyl, cresyl or benzyl group;
$R^{12}$=independently at each occurrence an alkyl chain having at least one branched structural element and having 4 to 20 carbon atoms,
and where for UR:
UR are independently at each occurrence identical or different divalent radicals of the form -U-$D^C$-U-, with $D^C$ independently at each occurrence a divalent substituted or unsubstituted, linear or branched, saturated or unsaturated hydrocarbon radical having 1 to 30 carbon atoms, selected from alkyl, alkenyl, aryl or alkaryl radicals.

5. The alkoxylation product according to claim 1, wherein at least one alkoxylation product of the formula (I) with in each case independently of one another i, j, k or l being 1 and v and u=0 is present.

6. The alkoxylation product according to claim 1 wherein the viscosity, determined at 25° C. and using a shear rate of 10 l/s, of the alkoxylation product of formula (I) lowers by at least 10% relative to the otherwise identical alkoxylation product with index x in the formulae (Ia) and (II)=0.

7. A process for preparing an alkoxylation product, said process comprising:
reacting at least one glycidyl ether of general formula (IVb)

where $R^{12}$ is independently at each occurrence a saturated or unsaturated, aliphatic or aromatic hydrocarbon radical having 2 to 30 C atoms, and/or an alkaryl group having 7 to 30, with the proviso that there must be at least one branched structural element present with at least one glycidyl ether of the general formula (V)

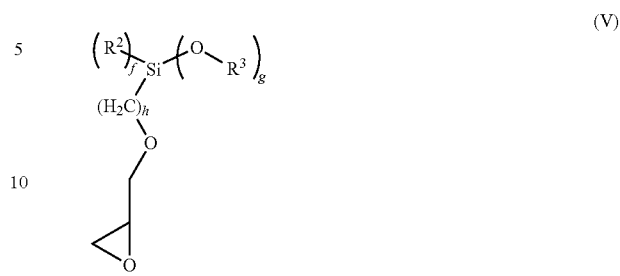

where f=0 to 2,
g=1 to 3,
with the proviso that g+f=3 and g is at least 1,
h=0 to 10,
$R^2$=independently at each occurrence an alkyl group having 1 to 8 carbon atoms,
$R^3$=independently at each occurrence an alkyl group having 1 to 8 carbon atoms.

8. The process according to claim 7, wherein said reacting comprises process step A and process step B, where in process step A alkoxylation is carried out in at least two steps, where the $1^{st}$ step comprises reacting a starter compound $D^x$ with propylene oxide, with which a molar mass of not more than from 500 to 3000 g/mol is built up, in the presence of a DMC catalyst, and the $2^{nd}$ step comprises addition and reaction of further propylene oxide, and of one or more compounds of the formula (VIb) and one or more of the compounds of the formula (V).

9. The process according to claim 8, in which the $2^{nd}$ step of process step A comprises addition and reaction of further propylene oxide, and of a compound of the formula (IVb), and a $3^{rd}$ step comprises addition and reaction of one or more of the compounds of the formula (V).

10. The process according to claim 8, wherein in the process step (B) (a), polyethers of the formula PE are reacted with diisocyanates and, in a second reaction step (b), the product of the first reaction step (a) is reacted with a molecule of the formula H-M.

11. The process according to claim 7, wherein compounds of the formula (IVb) of glycidyl ethers with $R^{12}$=alkyl chains having a total of 4 to 20 carbon atoms are employed.

12. The process according to claim 7, wherein compounds of the formula (V) of 3-glycidyloxypropyltrimethoxy- or -triethoxysilane are employed.

13. The process according to claim 7, wherein alkoxylation products of formula (I) with the indices i=2 to 4 and j, k, l=0 are reacted with polyisocyanates, in which case under polyisocyanate there must be at least two isocyanate groups in the reaction partner.

14. A curable composition comprising at least one alkoxylation product according to claim 1 and at least one curing catalyst.

15. The curable composition according to claim 14, comprising at least one further alkoxylation product which has no alkoxysilyl-functional groups as per the unit with the index a in the formulae (Ia) and (II), it being possible for the further alkoxylation product to correspond.

* * * * *